United States Patent
Plotnikov

(10) Patent No.: US 10,191,743 B2
(45) Date of Patent: Jan. 29, 2019

(54) VERSATILE PACKED DATA COMPARISON PROCESSORS, METHODS, SYSTEMS, AND INSTRUCTIONS

(71) Applicant: Intel Corporation, Santa Clara, CA (US)

(72) Inventor: Mikhail Plotnikov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 14/142,849

(22) Filed: Dec. 29, 2013

(65) Prior Publication Data

US 2015/0186141 A1   Jul. 2, 2015

(51) Int. Cl.
*G06F 15/00* (2006.01)
*G06F 15/76* (2006.01)
*G06F 9/30* (2018.01)

(52) U.S. Cl.
CPC ...... *G06F 9/30094* (2013.01); *G06F 9/30018* (2013.01); *G06F 9/30021* (2013.01); *G06F 9/30036* (2013.01); *G06F 9/30185* (2013.01)

(58) Field of Classification Search
CPC ............. G06F 9/30149; G06F 9/30036; G06F 9/30021; G06F 9/30018
USPC .......................................................... 712/7
See application file for complete search history.

(56) References Cited

U.S. PATENT DOCUMENTS

| 5,872,964 A * | 2/1999 | Ishiguro | G06F 9/30021 345/506 |
| 7,017,032 B2 * | 3/2006 | Wilson | G06F 9/30014 712/22 |
| 7,133,400 B1 * | 11/2006 | Henderson | H04L 29/06 370/389 |

FOREIGN PATENT DOCUMENTS

WO   2008/036945 A1   3/2008

OTHER PUBLICATIONS

Extended European Search Report received for European Patent Application No. 14194550.1, dated Jun. 9, 2015, 6 pages.
Slingerland, et al., "Multimedia Extensions for General Purpose Microprocessors: A Survey", Elsevier, Microprocessors and Microsystems, vol. 29, No. 5, Jun. 1, 2005, 22 pages.

(Continued)

*Primary Examiner* — Chun Kuan Lee
(74) *Attorney, Agent, or Firm* — NDWE, LLP

(57) ABSTRACT

A processor including a decode unit to decode a versatile packed data compare instruction to indicate a first source packed data operand to include a first plurality of data elements, a second source packed data operand to include a second plurality of corresponding data elements. The instruction to indicate a source comparison operation indication operand to include comparison operation indicators each to indicate a potentially different comparison operation for a different corresponding pair of data elements from the first and second source operands. An execution unit, in response to the instruction, to store a result in a destination storage location indicated by the instruction. Result to include result indicators each to correspond to a different one of the comparison operation indicators. Each result indicator to indicate a result of a comparison operation, indicated by the corresponding comparison operation indicator, performed on the corresponding pair of data elements.

16 Claims, 22 Drawing Sheets

(56) References Cited

OTHER PUBLICATIONS

Intel, "Intel 64 and IA-32 Architectures Software Developer's Manual", vol. 1: Basic Architecture, Order No. 253665-040US, Oct. 2011, 548 pages.
Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.
Intel,"Intel 64 and IA-32 Architectures Software Developer's Manual", vol. 3 (3A, 3B & 3C): System Programming Guide, Order No. 325384-040US, Oct. 2011, 1916 pages.
Intel, "Intel Advanced Vector Extensions Programming Reference", Jun. 2011, 595 pages.

\* cited by examiner

METHOD IN PROCESSOR
330

RECEIVE VERSATILE PACKED DATA COMPARE INSTRUCTION INDICATING FIRST SOURCE PACKED DATA OPERAND INCLUDING FIRST PLURALITY OF DATA ELEMENTS, INDICATING SECOND SOURCE PACKED DATA OPERAND INCLUDING SECOND PLURALITY OF DATA ELEMENTS, EACH DATA ELEMENT OF SECOND PLURALITY CORRESPONDING TO DATA ELEMENT OF FIRST PLURALITY IN CORRESPONDING RELATIVE POSITION, AND INDICATING SOURCE COMPARISON OPERATION INDICATION OPERAND INCLUDING COMPARISON OPERATION INDICATORS INDICATING AT LEAST TWO DIFFERENT COMPARISON OPERATIONS FOR AT LEAST TWO DIFFERENT CORRESPONDING PAIRS OF CORRESPONDING DATA ELEMENTS ~ 331

STORE RESULT IN DESTINATION STORAGE LOCATION IN RESPONSE TO INSTRUCTION, DESTINATION STORAGE LOCATION INDICATED BY INSTRUCTION, RESULT INCLUDING RESULT INDICATORS THAT EACH CORRESPOND TO DIFFERENT ONE OF COMPARISON OPERATION INDICATORS, EACH RESULT INDICATOR INDICATING RESULT OF COMPARISON OPERATION, INDICATED BY CORRESPONDING COMPARISON OPERATION INDICATOR, PERFORMED ON CORRESPONDING PAIR OF DATA ELEMENTS ~ 332

FIG. 3

OPERATION MASK
REGISTERS 1012

PACKED DATA OPERATION
MASK REGISTER 1112

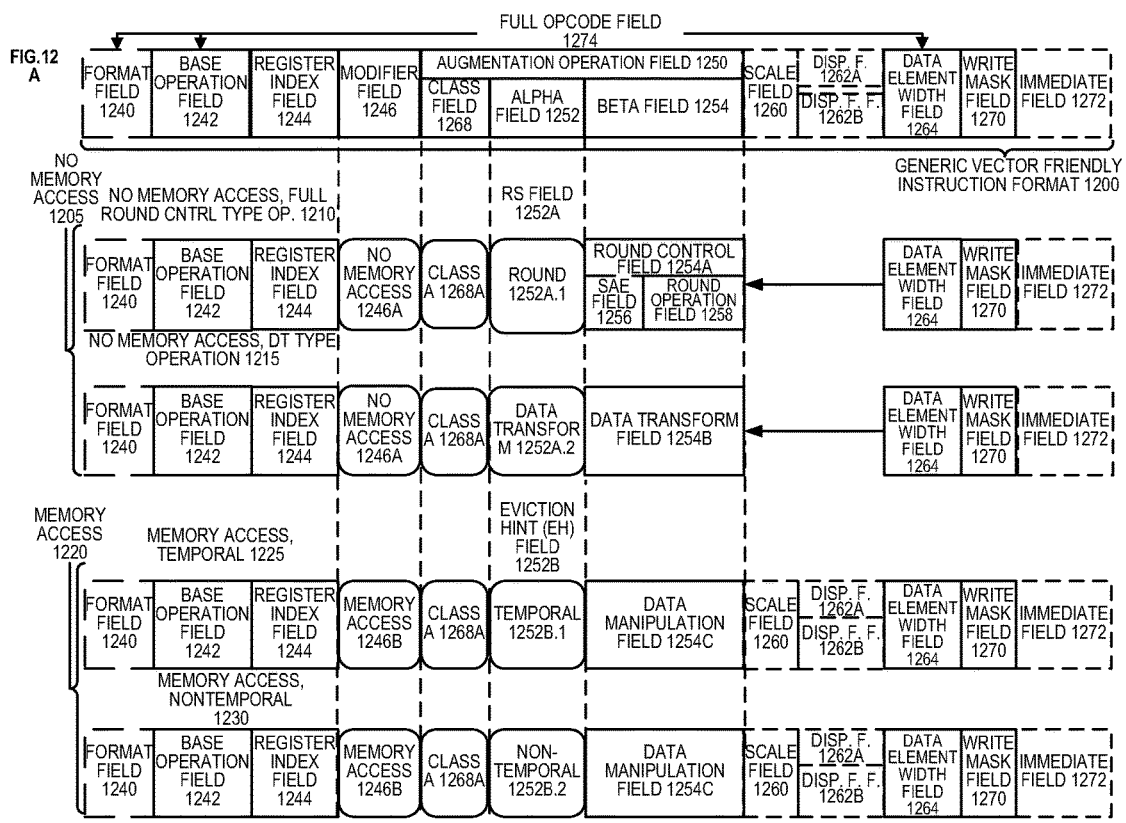

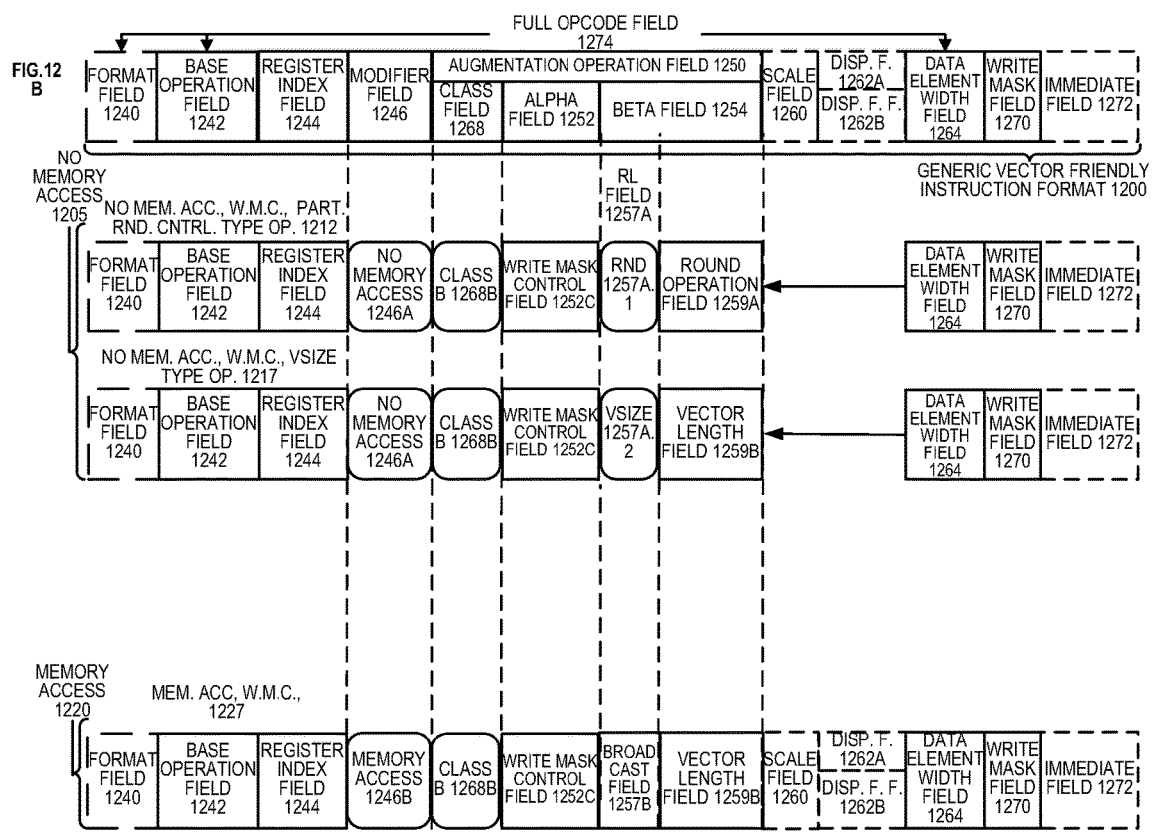

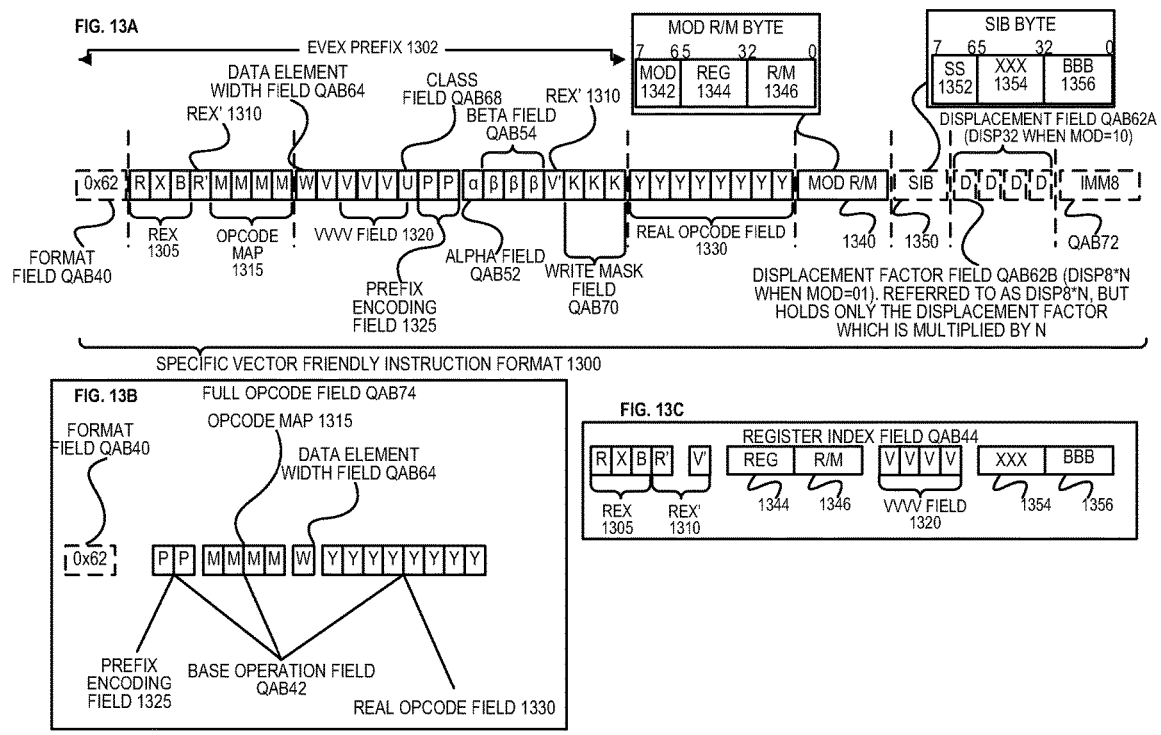

REGISTER ARCHITECTURE 1400
General Purpose Registers 1425
16 X 64 BITS
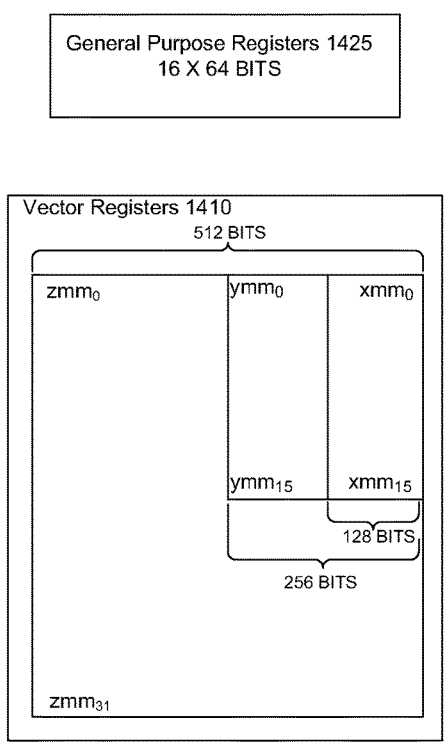
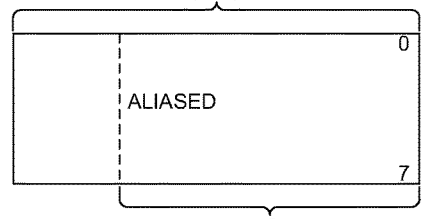
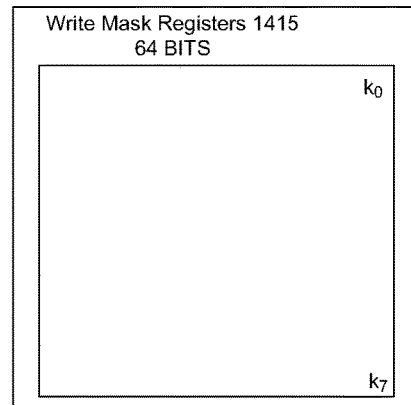
FIG. 14

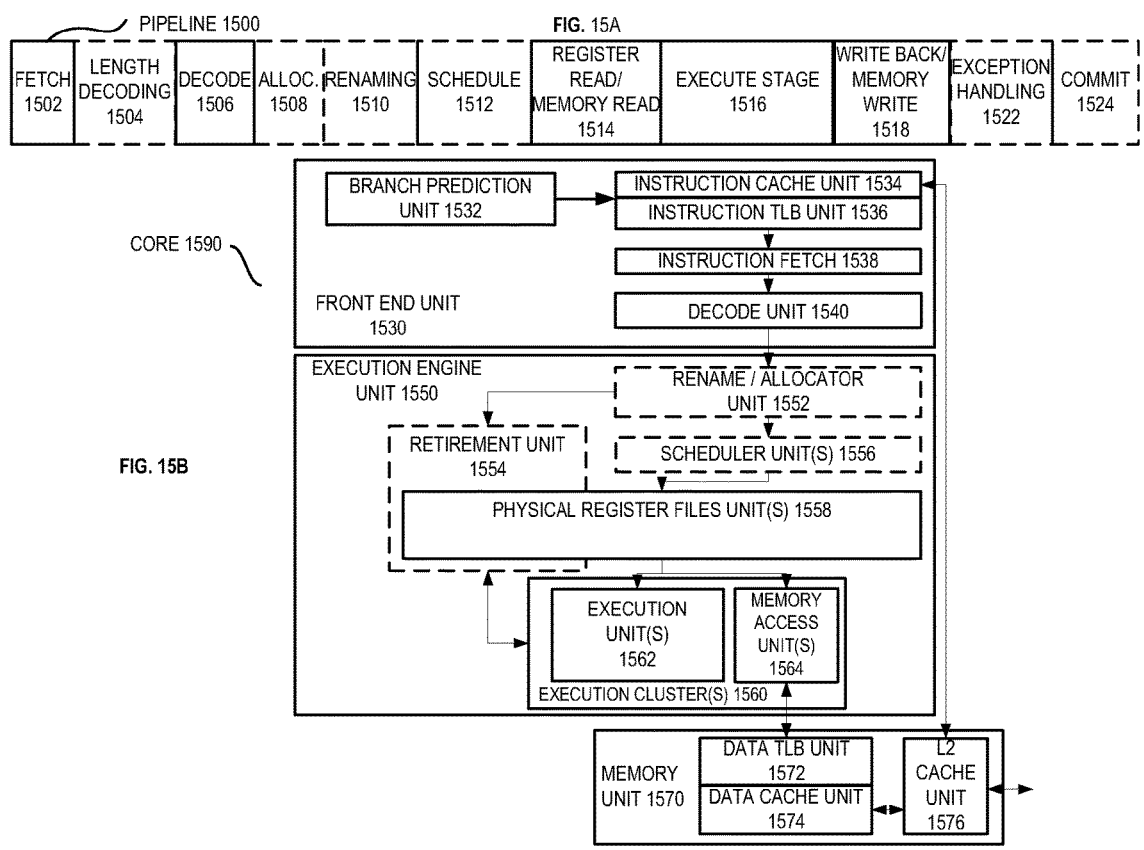

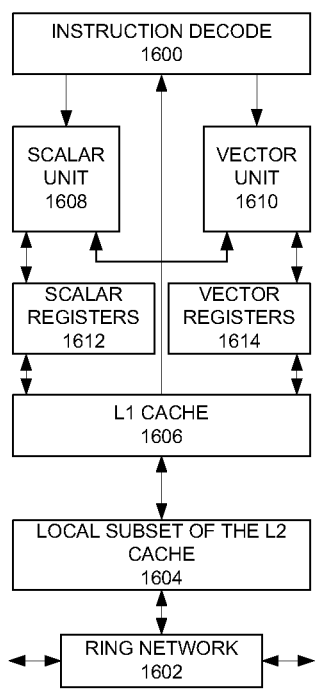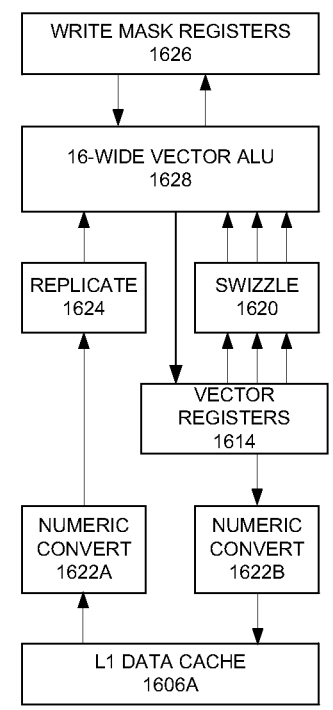

VERSATILE PACKED DATA COMPARISON PROCESSORS, METHODS, SYSTEMS, AND INSTRUCTIONS

BACKGROUND

Technical Field

Embodiments described herein generally relate to processors. In particular, embodiments described herein generally relate to processors to compare packed data responsive to packed data compare instructions.

Background Information

Many processors have Single Instruction, Multiple Data (SIMD) architectures. In SIMD architectures, a packed data instruction may operate on multiple data elements, or multiple pairs of data elements, simultaneously and/or in parallel. Multiple data elements may be packed within one register or memory location as packed data or vector data. In packed data, the bits of the register or other storage location may be logically divided into a sequence of data elements. For example, a 128-bit wide packed data register may have two 64-bit wide data elements, four 32-bit data elements, etc. Each of the data elements may represent a separate individual piece of data (e.g., a pixel color, etc.), which may be operated upon separately and/or independently of the others.

One known type of packed data instruction is a packed compare instruction. The packed compare instruction may cause a processor to compare pairs of corresponding data elements in corresponding positions in two source packed data operands according to a given single type of comparison operation. As one example, the packed compare instruction may indicate the comparison operation is "greater than," and the processor may determine whether each data element of a first source packed data operand is greater than a corresponding data element of a second source packed data operand. The processor may store a result packed data operand including a corresponding plurality of result packed data elements that each indicate the result of the "greater than" comparison operation performed on the corresponding pair of data elements.

BRIEF DESCRIPTION OF THE DRAWINGS

The invention may best be understood by referring to the following description and accompanying drawings that are used to illustrate embodiments. In the drawings:

FIG. 3 is a block flow diagram of an embodiment of a method of processing an embodiment of a versatile packed data compare instruction in a processor.

FIG. 12A is a block diagram illustrating a generic vector friendly instruction format and class A instruction templates thereof according to embodiments of the invention.

FIG. 12B is a block diagram illustrating the generic vector friendly instruction format and class B instruction templates thereof according to embodiments of the invention.

FIG. 13A is a block diagram illustrating an exemplary specific vector friendly instruction format according to embodiments of the invention.

FIG. 13B is a block diagram illustrating the fields of the specific vector friendly instruction format that make up the full opcode field according to one embodiment of the invention.

FIG. 13C is a block diagram illustrating the fields of the specific vector friendly instruction format 1300 that make up the register index field according to one embodiment of the invention.

FIG. 14 is a block diagram of a register architecture according to one embodiment of the invention.

FIG. 15A is a block diagram illustrating both an exemplary in-order pipeline and an exemplary register renaming, out-of-order issue/execution pipeline according to embodiments of the invention.

FIG. 15B is a block diagram illustrating both an exemplary embodiment of an in-order architecture core and an exemplary register renaming, out-of-order issue/execution architecture core to be included in a processor according to embodiments of the invention.

FIG. 16A is a block diagram of a single processor core, along with its connection to the on-die interconnect network and with its local subset of the Level 2 (L2) cache, according to embodiments of the invention.

FIG. 16B is an expanded view of part of the processor core in FIG. 16A according to embodiments of the invention.

DETAILED DESCRIPTION OF EMBODIMENTS

Disclosed herein are versatile packed data compare instructions, processors to execute the versatile packed data compare instructions, methods performed by the processors when processing or executing the versatile packed data compare instructions, and systems incorporating one or more processors to process or execute the versatile packed data compare instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
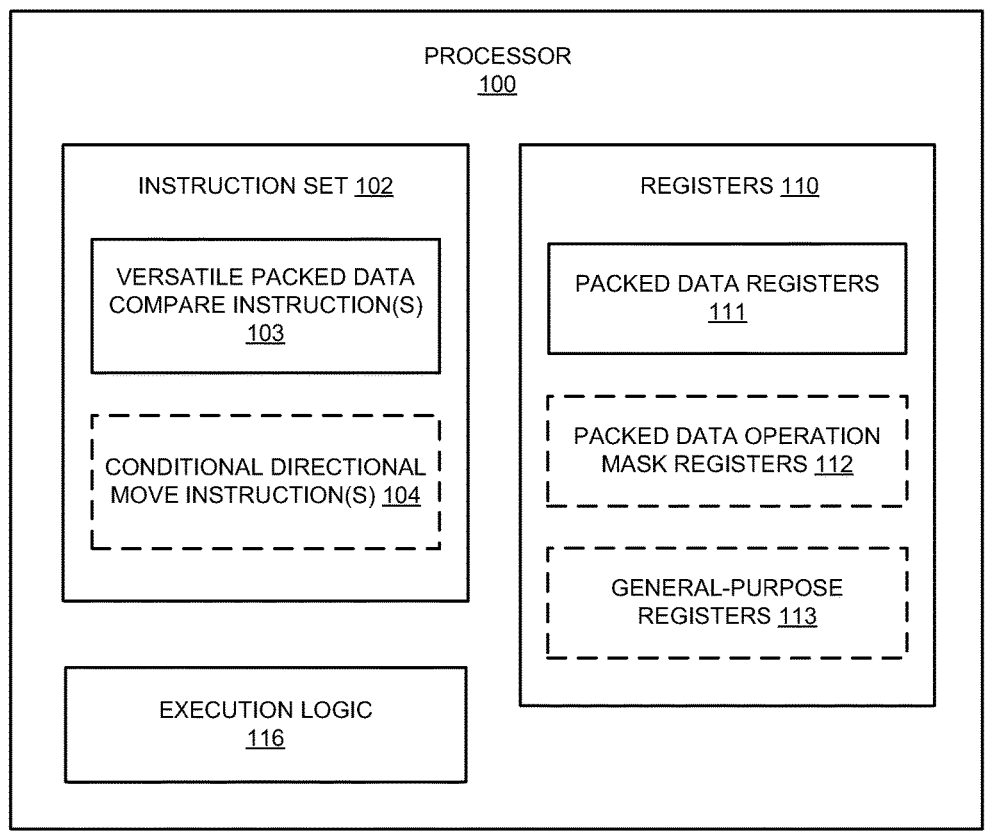
FIG. 1 is a block diagram of an embodiment of a processor.

FIG. 1 is a block diagram of an embodiment of a processor 100 operable to perform an embodiment of a versatile packed data compare instruction. In some embodiments, the processor may be a general-purpose processor (e.g., a general-purpose microprocessor of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors.

The processor includes an instruction set 102 including a set of instructions that the processor is operable to perform. The instructions of the instruction set represent macroinstructions, assembly language instructions, machine-level instructions, or other instructions provided to the processor for execution, as opposed to microinstructions, micro-ops, or decoded instructions. In some embodiments, the instruction set includes one or more versatile packed data compare instructions 103. In some embodiments, the instruction set includes one or more conditional directional move instructions 104, although this is not required. As will be explained further below, in some embodiments, an embodiment of a conditional directional move instruction 104 may move data based on conditional and directional interpretation of a result of an embodiment of a versatile packed data compare instruction 103.

The processor also includes architecturally-visible registers (e.g., an architectural register file) 110. The architectural registers may also be referred to herein simply as registers. Unless otherwise specified or apparent, the phrases architectural register, register file, and register are used herein to refer to registers that are visible to the software and/or programmer and/or the registers that are specified by instructions (e.g., macroinstructions, assembly language instructions, or machine-level instructions) to identify operands. These registers are contrasted to other non-architectural or non-architecturally visible registers in a given microarchitecture (e.g., temporary registers, reorder buffers, retirement registers, etc.). The registers generally represent on-die processor storage locations. The illustrated processor includes packed data registers 111 that operable to store packed data, vector data, or SIMD data. In some embodiments, the processor may also include packed data operation mask registers 112, although the scope of the invention is not so limited. In some embodiments, the processor may also include general-purpose registers 113.

The processor also includes execution logic 116 (e.g., one or more execution units). The execution logic is operable to execute or process the instructions of the instruction set (e.g., the versatile packed data compare instructions). In some embodiments, the execution logic may include particular logic (e.g., particular circuitry or hardware potentially combined with firmware) to execute these instructions.

Figure 2:
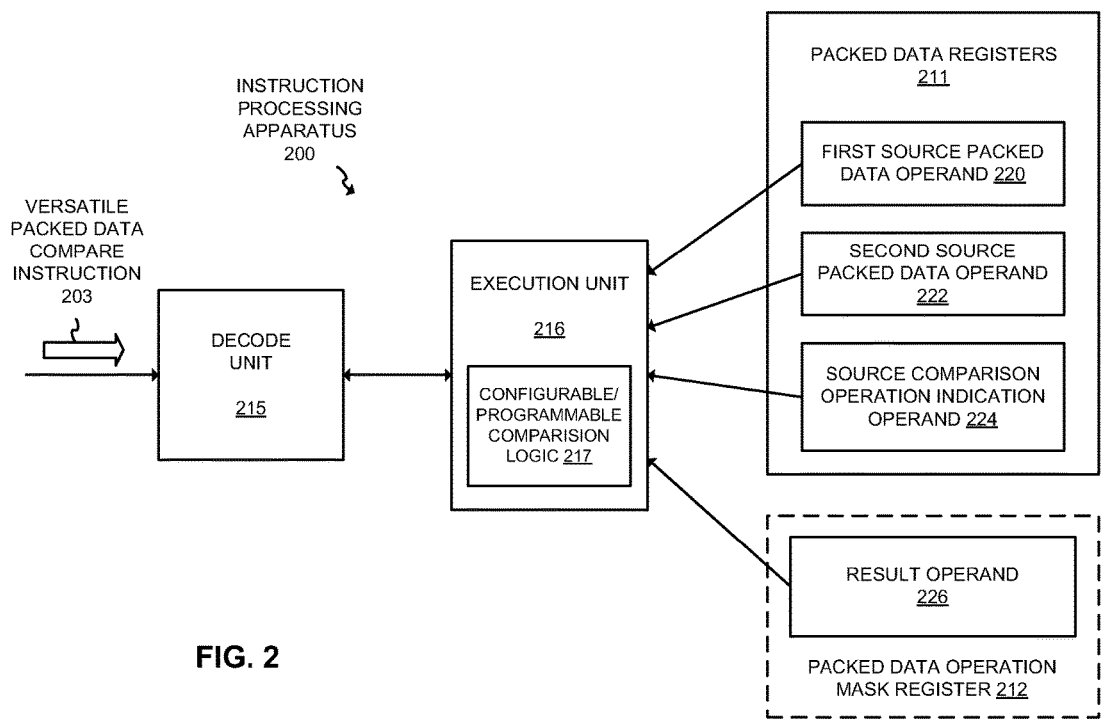
FIG. 2 is a block diagram of an embodiment of an instruction processing apparatus operable to perform an embodiment of a versatile packed data compare instruction.

FIG. 2 is a block diagram of an embodiment of an instruction processing apparatus 200 operable to perform an embodiment of a versatile packed data compare instruction 203. In embodiments, the apparatus may be a processor and/or may be included in a processor. For example, the apparatus may be, or may be included in, the processor of FIG. 1. The components, features, and specific optional details described herein for the processor of FIG. 1 also optionally apply to the apparatus. Alternatively, the apparatus may be, or may be included in, a similar or different processor. Moreover, the processor of FIG. 1 may include either a similar or different apparatus than the apparatus.

The apparatus 200 may receive the versatile packed data compare instruction 203. For example, the instruction may be received from an instruction fetch unit, an instruction queue, or the like. The versatile packed data compare instruction may represent a machine code instruction, assembly language instruction, macroinstruction, or instruction or control signal of an instruction set of the apparatus. The versatile packed data compare instruction may explicitly specify (e.g., through one or more fields or a set of bits), or otherwise indicate (e.g., implicitly indicate, be mapped to through emulation, etc.), a first source packed data operand 220 that is to include a first plurality of data elements, may specify or otherwise indicate a second source packed data operand 222 that is to include a second plurality of data elements. Each data element of the second plurality may correspond to a data element of the first plurality in a corresponding relative position (e.g., a corresponding bit position within the operands). The instruction may also explicitly specify or otherwise indicate a source comparison operation indication operand 224 that includes a plurality of comparison operation indicators. Each comparison operation indicator may be operable to indicate a potentially different comparison operation for a different corresponding pair of corresponding data elements from the first and second source packed data operands. In some embodiments, at least two, at least three, or more than three, different types of comparison operations may be indicated. The instruction may also specify or otherwise indicate a destination storage location (e.g., a packed data operation mask register 212) where a result 226 is to be stored.

The illustrated apparatus includes a decode unit or decoder 215. The decode unit may receive and decode the relatively higher-level macroinstruction, machine code instruction, or assembly language instruction, and output one or more relatively lower-level microinstructions, micro-operations, micro-code entry points, or other relatively lower-level instructions or control signals that reflect, represent, and/or are derived from the higher-level instruction. The one or more lower-level instructions or control signals may implement the higher-level instruction through one or more lower-level (e.g., circuit-level or hardware-level) operations. In some embodiments, the decode unit may include one or more input structures (e.g., input port(s), input interconnect(s), an input interface, etc.) to receive the instruction, an instruction recognition and decode logic coupled with the input structure(s) to receive, recognize, and decode the instruction into one or more corresponding control signals, and one or more output structures (e.g., output port(s), output interconnect(s), an output interface, etc.) coupled with the instruction recognition and decode logic to output the one or more corresponding control signals. The instruction recognition and decode logic of the decode unit may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the instruction being provided directly to the decode unit, an instruction emulator, translator, morpher, interpreter, or other instruction conversion module may optionally be used. Various different types of instruction conversion modules are known in the arts and may be implemented in software, hardware, firmware, or a combination thereof. In some embodiments, the instruction conversion module may be located outside the instruction processing apparatus, such as, for example, on a separate die and/or in a memory (e.g., as a static, dynamic, or runtime instruction emulation module). By way of example, the instruction conversion module may receive the instruction which may be of a first instruction set and may emulate, translate, morph, interpret, or otherwise convert the instruction into one or more corresponding or derived intermediate instructions or control signals which may be of a second different instruction set. The one or more instructions or control signals of the second instruction set may be provided to a decode unit that is operable to decode instructions or control signals of the second instruction set. The decode unit may decode the received one or more instructions or control signals of the second instruction set into one or more lower-level instructions or control signals executable by native hardware of the apparatus (e.g., one or more execution units).

The apparatus 200 also includes a set of packed data registers 211. Each of the packed data registers may represent an on-die storage location that is operable to store packed data, vector data, or SIMD data. The packed data registers may be implemented in different ways in different microarchitectures using well-known techniques and are not limited to any particular type of circuit. Various different types of registers are suitable. Examples of suitable types of registers include, but are not limited to, dedicated physical registers, dynamically allocated physical registers using register renaming, and combinations thereof. As shown, in some embodiments, the first source packed data 220 may be stored in a first packed data register, the second source packed data 222 may be stored in a second packed data register, and the source comparison operation indication operand 224 may be stored in a third packed data register, although the scope of the invention is not so limited. Alternatively, memory locations, or other storage locations, may be used for one or more of these operands. Also, in another embodiment, the source comparison operation indication operand 224 may instead be provided by an immediate of the instruction.

Referring again to FIG. 2, the execution unit 216 is coupled with the decode unit 215 and the packed data registers 211. The execution unit may receive the one or more decoded or otherwise converted instructions or control signals that represent and/or are derived from the versatile packed data compare instruction 203. The execution unit may also receive the first source packed data operand 220, the second source packed data operand 222, and the source comparison operation indication operand 224, which are indicated by the versatile packed data compare instruction. In some embodiments, the source comparison operation indication operand may include a plurality of comparison operation indicators that are each operable to indicate a potentially different comparison operation for a different corresponding pair of corresponding data elements from the first and second source packed data operands. In various embodiments, at least two, at least three, or more than three, different types of comparison operations may be specified. Examples of suitable types of comparison operations that may be indicated include, but are not limited to, equal to (=), greater than (>), greater than or equal to (≥), less than (<), and less than or equal to (≤). Other types of comparison operations known in the art may also optionally be used.

Commonly, each comparison operation indicator may include a set of one or more bits sufficient to uniquely identify any one of the set of supported different types of comparison operations for the particular implementation. For example, one bit may be used to uniquely identify any one of two different comparison operations, two bits may be used to uniquely identify any one of four different comparison operations, three bits may be used to uniquely identify any one of eight different comparison operations, and so on. In some embodiments, the source comparison operation indication operand may be a packed data operand in a packed data register, and each of the comparison operation indicators may be included in and/or provided by a corresponding data element. For example, a least significant byte of each data element may include a comparison operation indicator (e.g., one, two, three, or four bits to identify the corresponding comparison operation). In other embodiments, the source comparison operation indication operand may be an immediate and each of the comparison operation indicators may represent a different subset of one or more bits of the immediate. For example, bits [1:0] of an immediate may represent a first comparison operation indicator, bits [3:2] of the immediate may represent a second comparison operation indicator, bits [5:4] may represent a third comparison operation indicator, and so on.

The execution unit may be operable in response to and/or as a result of the versatile packed data compare instruction (e.g., in response to one or more instructions or control signals decoded directly or indirectly (e.g., through emulation) from the instruction) to store a result 226 in a destination storage location indicated by the instruction (e.g., a packed data operation mask register 212). In some embodiments, the result may include a plurality of result indicators that are each to correspond to a different one of the comparison operation indicators and/or correspond to a different pair of corresponding data elements from the first and second source packed data operands. In some embodiments, each result indicator may be operable to indicate a result of a corresponding comparison operation, which is indicated by the corresponding comparison operation indicator, which has been performed on the corresponding pair of data elements from the first and second source packed data operands. That is, the execution unit may perform different types of comparison operations as specified in the source comparison operation indication operand.

As shown in the illustration, in some embodiments, the result may be stored in a packed data operation mask and/or packed data operation mask register. Each result indicator of the packed data operation mask may indicate whether or not a corresponding comparison operation was evaluated to be true or false. By way of example, in some embodiments, each result indicator may be a single bit that may be set to binary one (i.e., "1") to indicate that the result of the corresponding comparison was evaluated to be true, or that may be cleared to binary zero (i.e., "0") to indicate that the result of the corresponding comparison was evaluated to be false. Packed data operation masks and mask registers are discussed further below. Alternatively, in other embodiments, the result may be stored in a general-purpose register. In still other embodiments, the result may be stored as a packed data result operand in a packed data register. For example, in various embodiments, all bits of a result data element, a most significant bit of the result data element, a least significant bit of the result data element, or some other predetermined bit of the result data element, may be set to indicate the comparison evaluated to be true or cleared to indicate the comparison evaluated to be false.

The execution unit and/or the instruction processing apparatus may include specific or particular logic (e.g., transistors, integrated circuitry, or other hardware potentially combined with firmware (e.g., instructions stored in non-volatile memory) and/or software) that is operable to perform the versatile packed data compare instruction and/or store the result in response to the versatile packed data compare instruction (e.g., in response to one or more instructions or control signals decoded or otherwise derived from the versatile packed data compare instruction). By way of example, the execution unit may include a logic unit, an arithmetic logic unit, a digital circuit to perform logical operations, or the like. In some embodiments, the execution unit may include one or more input structures (e.g., input port(s), input interconnect(s), an input interface, etc.) to receive source operands, comparison circuitry or other logic (e.g., configurable and/or programmable comparison logic 217) coupled with the input structure(s) to receive and process source data elements and generate result data, and one or more output structures (e.g., output port(s), output interconnect(s), an output interface, etc.) coupled with the comparison circuitry or other logic to output the result data. In some embodiments, the configurable and/or programmable comparison logic 217 may include a plurality of programmable and/or configurable comparison logic portions each operable to be programmed and/or configured by a corresponding comparison operation indicator to perform a corresponding potentially different comparison operation.

Advantageously, instead of only being able to use a single type of comparison operation for all corresponding pairs of source data elements, the versatile packed data compare instruction is versatile in that it allows the possibility or option of having different comparison operations for at least some, or potentially all, different corresponding pairs of source data elements. That is, the versatile packed data compare instruction is configurable or flexible in that it may allow a programmer, a compiler, or the like, to specify at least two different types of comparison operations, or potentially different types of comparison operations for the different corresponding pairs of corresponding data elements from the first and second source packed data operands.

FIG. 3 is a block flow diagram of an embodiment of a method 330 of processing an embodiment of a versatile packed data compare instruction in a processor. In various embodiments, the method may be performed by a processor, instruction processing apparatus, or other digital logic device. In some embodiments, the operations and/or method of FIG. 3 may be performed by and/or within the processor of FIG. 1 and/or the apparatus FIG. 2. The components, features, and specific optional details described herein for the processor and/or apparatus of FIGS. 1-2 also optionally apply to the operations and/or method of FIG. 3. Alternatively, the operations and/or method of FIG. 3 may be performed by and/or within a similar or different processor or apparatus. Moreover, the processor of FIG. 1 and/or the apparatus of FIG. 2 may perform operations and/or methods the same as, similar to, or different than those of FIG. 3.

The method includes receiving the versatile packed data compare instruction, at block 331. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The versatile packed data compare instruction may specify or otherwise indicate a first source packed data operand including a first plurality of data elements, and may specify or otherwise indicate a second source packed data operand including a second plurality of data elements. Each data element of the second plurality may correspond to a different data element of the first plurality in a corresponding relative position. The versatile packed data compare instruction may also specify or otherwise indicate a source comparison operation indication operand including a plurality of comparison operation indicators. The plurality of comparison operation indicators may each be operable to indicate a potentially different comparison operation for a corresponding different pair of corresponding data elements. In various aspects, the comparison operation indicators may indicate at least two, at least three, or more than three different comparison operations.

A result may be stored in a destination storage location indicated by the versatile packed data compare instruction in response to and/or as a result of the versatile packed data compare instruction, at block 332. Representatively, an execution unit, instruction processing apparatus, or processor may perform the instruction and store the result. In some embodiments, the result may include a plurality of result indicators that each are to correspond to a different one of the comparison operation indicators and/or correspond to a different pair of corresponding data elements from the first and second source packed data operands. In some embodiments, each result indicator may indicate a result of a corresponding comparison operation, which is indicated by the corresponding comparison operation indicator, which has been performed on the corresponding pair of data elements the first and second source packed data operands.

The illustrated method involves architectural operations (e.g., those visible from a software perspective). In other embodiments, the method may optionally include one or more microarchitectural operations. By way of example, the instruction may be fetched, decoded, source operands may be accessed, an execution unit may be enabled to perform and may perform microarchitectural operations to implement the instruction, etc. In some embodiments, configurable and/or programmable comparison logic of an execution unit may be configured or programmed to perform different types of comparison operations based on the source comparison operation indication operand of the instruction.

Figure 4:
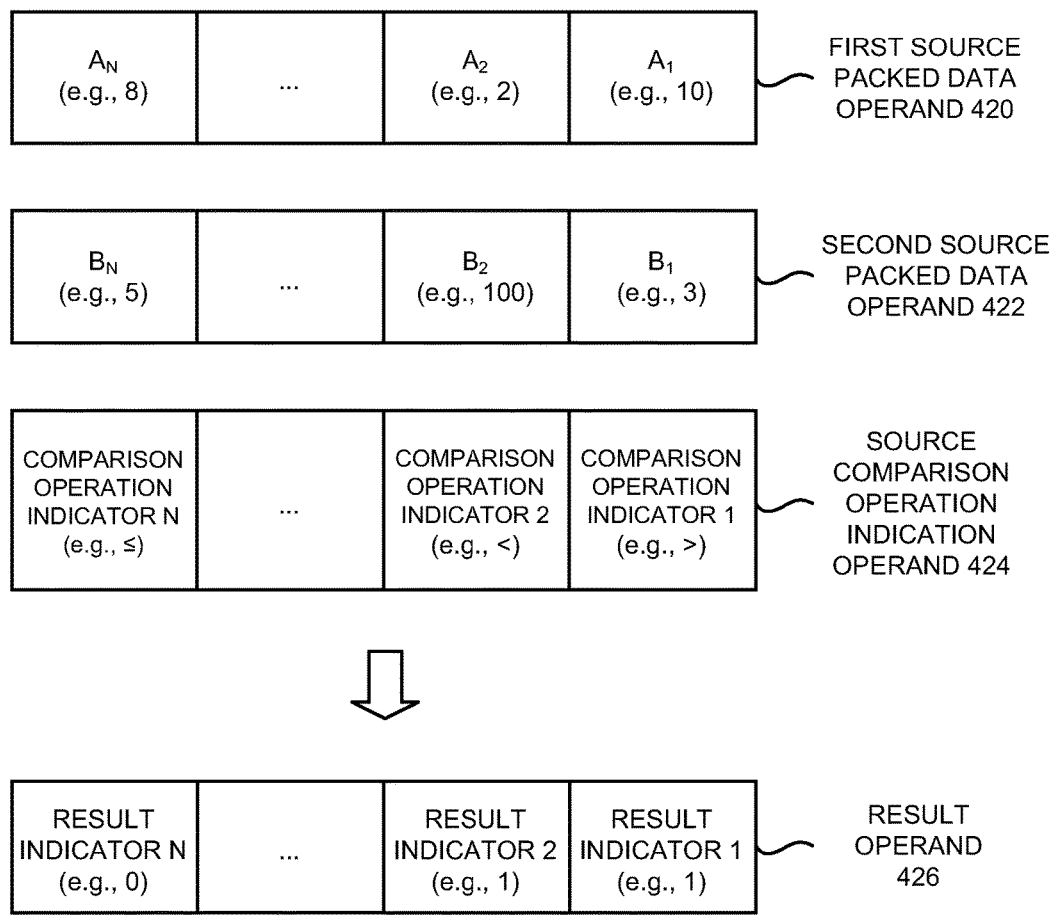
FIG. 4 is a block diagram of an embodiment of a versatile packed compare operation.

FIG. 4 is a block diagram illustrating an embodiment of a versatile packed compare operation 430 that may be performed in response to an embodiment of a versatile packed compare instruction. The instruction may specify or otherwise indicate a first source packed data operand 420 including a first plurality of packed data elements $A_1$-$A_N$, and a second source packed data operand 422 including a second plurality of packed data elements $B_1$-$B_N$. Each data element in the first operand may correspond to a different data element in the second operand in a corresponding relative position within the operands (e.g., $A_1$ may correspond to $B_1$, $A_2$ may correspond to $B_2$, etc.).

Commonly, the number of data elements in each source packed data operand may be equal to the size in bits of the operand divided by the size in bits of a data element. In various embodiments, the widths of each of the first and second source packed data operands may be 64-bits, 128-bits, 256-bits, 512-bits, or 1024-bits, although the scope of the invention is not so limited. In various embodiments, each packed data element may be an 8-bit byte, a 16-bit word, a 32-bit doubleword, a 32-bit single precision floating point, a 64-bit quadword, or a 64-bit double precision floating point, although the scope of the invention is not so limited. In various embodiments, there may be at least two, at least four, at least eight, at least sixteen, at least thirty-two, or more than thirty-two data elements, in each of the source packed data operands. Without limitation, each data element may potentially/optionally have a different value. In the illustrated example embodiment, $A_1$ has a value of 10, $A_2$ has a value of 2, $A_N$ has a value of 8, $B_1$ has a value of 3, $B_2$ has a value of 100, and $B_N$ has a value of 5, although this is only one example. Although integers are used in this example, it is not required.

The instruction may also specify or otherwise indicate a source comparison operation indication operand 424, which may include a plurality of comparison operation indicators. In the illustration, comparison operation indicators 1 through N are shown. Each comparison operation indicator may correspond to a pair of corresponding data elements from the first and second source operands in a same relative position within the operands. For example, comparison operation indicator 1 may correspond to the pair of data elements $A_1$ and $B_1$, comparison operation indicator 2 may correspond to the pair of data elements $A_2$ and $B_2$, and so on. Each comparison operation indicator may represent one or more bits or a code to specify or otherwise indicate a potentially different type of comparison operation. In the illustrated example embodiment, comparison operation indicator 1 indicates greater than (>), comparison operation indicator 2 indicates less than (<), and comparison operation indicator N indicates less than or equal to (≤), although this is only one example. It is also possible for only a subset of the pairs of data elements (e.g., a least significant subset) to have corresponding comparison operation indicators, and for a remainder to have don't care values for which comparisons don't necessarily need to be made and/or results of the comparisons don't need to be considered.

A result 426 may be generated (e.g., by an execution unit) and stored in a destination storage location in response to the versatile packed compare instruction. The destination storage location may be specified or otherwise indicated by the instruction. In various embodiments, the destination storage location may be a packed data operation mask register, a general-purpose register, or other storage location (e.g., a packed data register, a memory location, etc.). The result may include a plurality of result indicators that are each to correspond to a different one of the comparison operation indicators. In the illustrated embodiment, result indicators 1 through N are shown. Each result indicator may correspond to a comparison operation indicator and/or a pair of corresponding data elements from the first and second source operands in a same relative position within the operands. For example, result indicator 1 may correspond to comparison operation indicator 1 and/or the pair of elements $A_1$ and $B_1$, result indicator 2 may correspond to comparison operation indicator 2 and/or the pair of elements $A_2$ and $B_2$, and so on.

In some embodiments, each result indicator may indicate a result of a comparison operation, indicated by the corresponding comparison operation indicator, performed on the corresponding pair of data elements. In some embodiments, a single bit may be set to a value of binary one (i.e., "1") to reflect a "true" result, or cleared to a value of binary zero (i.e., "0") to reflect a false result, although the scope of the invention is not so limited. By way of example, for the particular values and comparison operations shown in the illustration, the result indicator 1 may have a value of binary one (i.e., "1") to reflect a "true" result for the corresponding comparison operation, since 10 is greater than (>) 3, the result indicator 2 may have a value binary one (i.e., "1") to reflect a "true" result for the corresponding comparison operation, since 2 is less than (<) 100, and the result indicator N may have a value of binary zero (i.e., "0") to reflect a "false" result for the corresponding comparison operation, since 8 is not less than or equal to (≤) 5. It is to be appreciated that this is only one illustrative example, and that other values, types of comparison operations, and ways of expressing the result indicators may be used instead.

Figure 5:
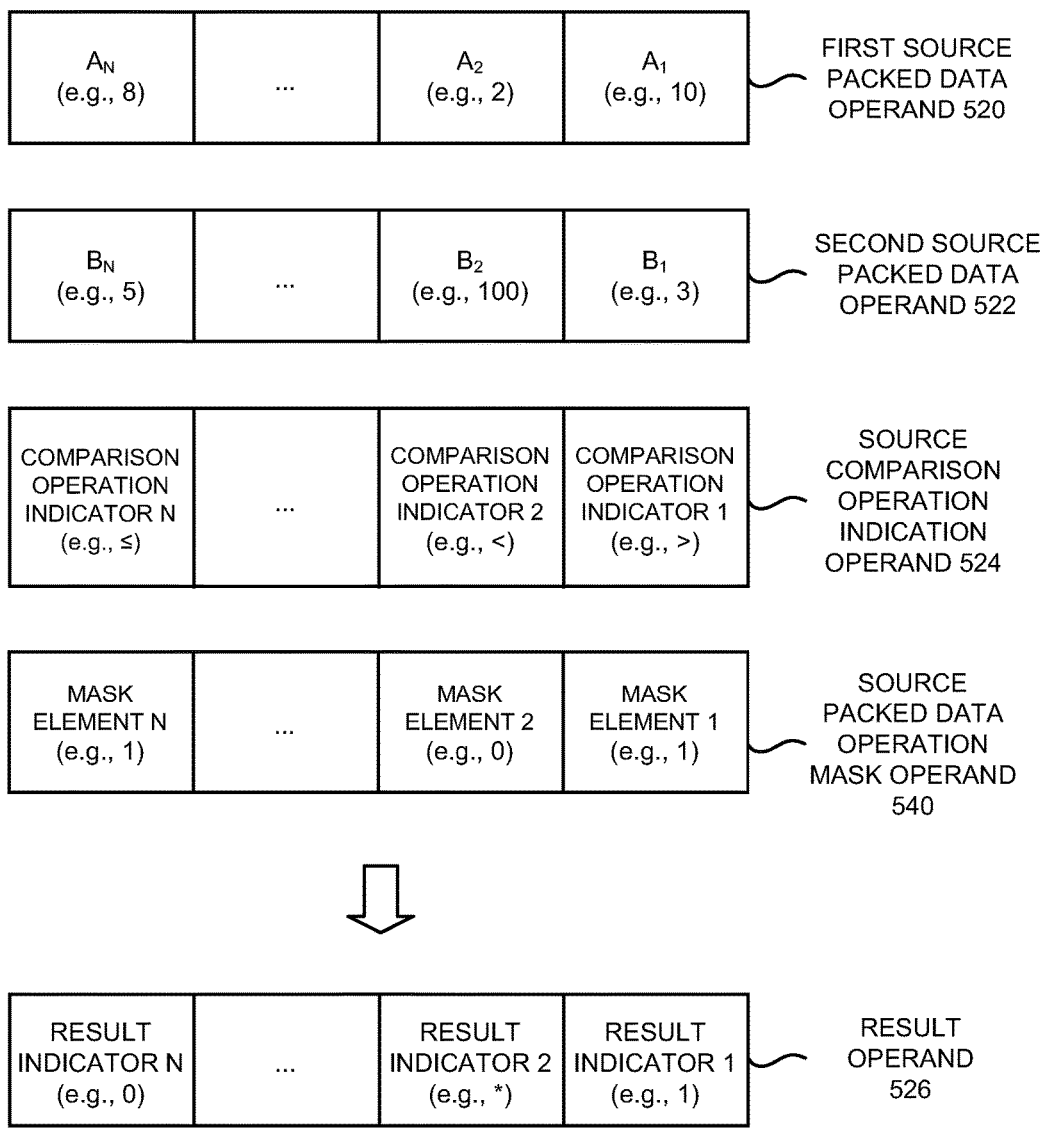
FIG. 5 is a block diagram of an embodiment of a masked versatile packed compare operation.

FIG. 5 is a block diagram illustrating an embodiment of a masked versatile packed compare operation 530 that may be performed in response to an embodiment of a masked versatile packed compare instruction. The masked operation of FIG. 5 has certain similarities to the unmasked operation of FIG. 4. To avoid obscuring the description, the different and/or additional characteristics for the masked operation of FIG. 5 will primarily be described without repeating all the similar or common characteristics relative to the unmasked operation of FIG. 4. However, it is to be appreciated that the previously described characteristics and details of the unmasked operation may also optionally apply to FIG. 5 unless clearly apparent otherwise.

As in the previously described unmasked operation, the masked instruction may specify or otherwise indicate a first source packed data operand 520, a second source packed data operand 522, and a source comparison operation indication operand 524. Each of these operands may be similar to, or the same as, those previously described for FIG. 4, and may have the same variations and alternatives.

In some embodiments, the masked versatile packed compare instruction may optionally specify or otherwise indicate a source packed data operation mask 540. The packed data operation mask may also be referred to herein simply as an operation mask, predicate mask, or mask. The mask may represent a predicate operand or conditional control operand that is used to mask, predicate, or conditionally control whether or not operations (e.g., comparison operations) are to be performed. In some embodiments, the masking or predication may be at per-data element granularity such that operations on different pairs of corresponding data elements may be predicated or conditionally controlled separately and/or independently of others. The mask may include multiple mask elements, predicate elements, or conditional control elements. In one aspect, the elements may be included in a one-to-one correspondence with corresponding pairs of source data elements and/or result indicators. As shown, in some embodiments, each mask element may be a single mask bit. In such cases, the source packed data operation mask may have a width in bits equal to the number of data elements in a source packed data operand and/or a number of comparison operation indicators in the comparison operation indication operand. Alternatively, two or more bits may be used for each mask element.

A value of each mask bit may control whether or not an operation (e.g., a comparison operation) is to be performed. According to one possible convention, each mask bit may have a first value (e.g., be set to binary one) to allow the comparison operation to be performed on the corresponding pair of data elements and a corresponding result indicator to be stored in the destination storage location, or a second value (e.g., be cleared to binary zero) to not allow the comparison operation to be performed on the corresponding pair of data elements and/or not allow the corresponding result indicator to be stored in the destination storage location. The illustrated example follows such a possible convention where a mask bit cleared to binary zero (i.e., 0) represents a masked out comparison operation, whereas a mask bit set to binary one (i.e., 1) indicates an unmasked comparison operation. In the illustrated example, the pair of data elements $A_1$ and $B_1$ and/or the comparison operation indicator 1 correspond to a mask element that is unmasked (i.e., set to 1), the pair of data elements $A_2$ and $B_2$ and/or the comparison operation indicator 2 correspond to a mask element that is masked (i.e., cleared to 0), and the pair of data elements $A_N$ and $B_N$ and/or the comparison operation indicator N correspond to a mask element that is unmasked (i.e., set to 1), although this is only one example.

As before, a result 526 may be generated (e.g., by an execution unit) and stored in a destination storage location in response to the masked versatile packed compare instruction. In various embodiments, the destination storage location may be a packed data operation mask register, a general-purpose register, or other storage location (e.g., a packed data register, a memory location, etc.). The result may include a plurality of result indicators that are each to correspond to a different one of the comparison operation indicators and/or pairs of corresponding data elements. For each unmasked element in the mask, the associated comparison operation is to be performed according to the corresponding comparison operation indicator, and the corresponding result indicator is to be stored in the result. The result indicators corresponding to each unmasked mask element in the packed data operation mask may have values that depend on the evaluation of the corresponding comparison operation performed on the corresponding pair of data elements. In the illustrated example, the result indicators 1 and N have the same values reflecting the evaluation of the comparison operation as previously described for FIG. 4, since their corresponding mask elements are each unmasked (e.g., set to 1).

In contrast, for each masked element in the mask, the associated comparison operation need not necessarily be performed and/or a result indicator based on the comparison need not be stored in the result. The result indicators corresponding to each masked-out mask element may have values that do not necessarily depend on the evaluation of the corresponding comparison operation performed on the corresponding pair of data elements. Rather, these result indicators may have fixed or predetermined values regardless of the evaluation of the comparison operation (e.g., the comparison operation need not even be performed). In the illustrated example, the result indicator 2 has an asterisk (*), since its corresponding mask element is masked-out (e.g., cleared to 0). The asterisk (*) is used to represent a fixed or predetermined value that does not depend on the comparison operation. The fixed or predetermined value may depend on the type of masking employed. In some embodiments, zeroing masking may be used, although the scope of the invention is not so limited. In zeroing-masking, the result indicators that correspond to masked-out mask elements (e.g., those cleared to 0) may be zeroed-out and/or a value of zero may be stored in the corresponding position in the destination storage location.

One potential advantage of such a masked versatile compare operation and/or instruction is that often the number of needed comparisons may be less than the number of pairs of source data elements. For example, as previously described, sometimes a relatively large number of data elements may be present in the source operands (e.g., 16, 32, etc.), whereas fewer comparisons need to be performed. In such cases, a full pairwise comparison of all corresponding source elements would yield result indicators that are not needed. Masking may optionally be used to remove these unneeded comparisons. This may potentially be used to reduce power, avoid taking unnecessary exceptions, avoid additional instructions to eliminate the unneeded result indicators, or the like. Alternatively, if desired, all comparisons may optionally be performed and one or more additional instructions may optionally be used to remove or eliminate the unneeded result indicators.

Listed below is pseudocode for particular example embodiments of versatile packed compare instructions named VCMPGEN. In the code, zmm1, zmm2, and zmm3 correspond to 512-bit packed data registers. In alternate embodiments, one or more of the source operands may be taken from a memory location or other storage location instead of a packed data register. Among these, zmm1 may provide a first source packed data operand, zmm2 may provide a second source packed data operand, and zmm3 may provide a source comparison operation indication operand indicating a plurality of potentially different types of comparison operations to perform on the first and second source packed data operands. The source comparison operation indication operand may represent a vector or array of coded comparison operation type indicators. The operand {k2} corresponds to a packed data operation mask (e.g., a packed data operation mask register) that is used as a predication or conditional control mask. The operand k1 corresponds to a packed data operation mask (e.g., a packed data operation mask register) that is used to store a result operand. In the code, "j" is a position counter within the operands, KL is the number of positions within the operands, and "Op" refers to a comparison operation specified by the source comparison operation indication operand. In this example, zeroing-type masking is used. The data may be byte, word, doubleword, quadword, single precision, or double precision, to name a few examples.

```
VCMPGEN k1{k2},zmm1,zmm2,zmm3
for(j=0; j<KL; j++){
    if(k2[j]){
        Op=zmm3[j];
        if(zmm1[j] Op zmm2[j]) k1[j]=1;
        else k1[j]=0;
    }else{
        k1[j]=0; } }
```

In one particular non-limiting example embodiment, packed data elements of zmm3 may have a value of 0 to mean "equal to", a value of 1 to mean "greater than", a value of 2 to mean "less than", a value of 3 to mean "greater than or equal to", and a value of 4 to mean "less than or equal to". Alternatively, any other desired coding scheme may be used instead.

In another embodiment, instead of using a packed data operand and/or packed data register zmm3 to hold the source comparison operation indication operand, an immediate (imm) may be used instead of zmm3, as shown in the following alternate embodiment of the VCMPGEN instruction. In the code, "FS" is a number of bits (field size) in the immediate operand used to encode the plurality of comparison operation indicators.

```
VCMPGEN k1{k2},zmm1,zmm2,imm
    for(j=0; j<KL; j++){
        if(k2[j]){
            Op=imm[j*FS+FS-1;j*FS];
            if(zmm1[j] Op zmm2[j]) k1[j]=1;
            else k1[j]=0;
        }else{
            k1[j]=0; } }
```

The use of the immediate is possible in embodiments where comparison operations are known at compile time. The immediate may include a plurality of sets of one or more bits each to select the appropriate type of comparison operation. As one particular example, an 8-bit immediate may have four 2-bit fields each representing a different comparison operation indicator and each able to select between four possible types of comparison operations. As another example, a 4-bit immediate may have four 1-bit fields, or two 2-bit fields.

It is to be appreciated that these are just a few illustrative examples of suitable embodiments of instructions. Other embodiments may use either narrower (e.g., 64-bit, 128-bit, 256-bit) or wider (e.g., 1024-bit) source packed data operands than the 512-bit operands shown. Other embodiments may not use masking/predication. Other embodiments may store the result in a general-purpose register, packed data register, or other storage location.

In some embodiments, any of the previously described versatile packed compare instructions/operations disclosed elsewhere herein may also optionally modify one or more flags. As used herein, the term flag is used broadly to refer to one or more bits used to represent a status, state, condition, or outcome of operations within the processor. In some embodiments, the one or more flags may include a carry flag (CF) and a zero flag (ZF). A carry flag (CF) is a well-known type of flag that is commonly found in processors and other logic devices. The carry flag may represent an architectural flag that is commonly used to indicate whether or not there is overflow in arithmetic operations. For example, conventionally the carry flag may have a first value if there is overflow during a prior calculation, or the carry flag may have a second value if there is no such overflow. A zero flag (ZF) is another well-known type of flag that is commonly found in processors and other logic devices. The zero flag is often set if an arithmetic operation yields a result that is zero, or is otherwise reset. In some other architectures, the CF and ZF are referred to by different names, and it is to be understood that referring to the CF or ZF also intends to encompass referring to these other names of these analogous flags/status indicators in these other architectures.

In some embodiments, a various versatile packed compare instruction/operation may optionally clear a first flag (e.g., a carry flag or other flag that is used to indicate whether or not there is overflow in arithmetic operations) if no unmasked comparison operations are evaluated to be true, or otherwise optionally set the first flag (e.g., the carry flag). In some embodiments, a various versatile packed compare instruction/operation may optionally set a second flag (e.g., a zero flag or other flag that is used to indicate whether or not a result is zero) if no unmasked comparison operations are evaluated to be true, or otherwise optionally clear the second flag (e.g., the zero flag). For example, in the case of the VCMPGEN instructions disclosed immediately above, in one embodiment, the operation may include:

```
VCMPGEN k1{k2},zmm1,zmm2,zmm3
    CF=0;
    ZF=1;
    for(j=0; j<KL; j++){
        if(k2[j]){
            Op=zmm3[j];
            if(zmm1[j] Op zmm2[j]){
                k1[j]=1;
                if (CF==0) CF=1;
                if (ZF==1) ZF=0;
            }else k1[j]=0;
        }else{
            k1[j]=0; } }
```

The one or more flags may be inspected after the execution of the VCMPGEN instruction to determine how the comparisons were evaluated. For example, when the carry flag (CF) is set to 1 it may mean that at least one comparison is evaluated to be true, and when the zero flag (ZF) is set to 1 it may mean that all comparisons (or at least all unmasked comparisons) were evaluated to be false. It is to be appreciated that such use of the CF and ZF may communicate complementary or related information. The CF set to 1 may instead be represented by the ZF is set to 0, and vice versa. Accordingly, in some embodiments, only one of these flags may be modified. Further, modification of these one or more flags is optional not required.

The versatile packed compare instructions/operations disclosed herein are general-purpose instructions that have general-purpose uses. For example, these instructions may generally be used anywhere in which performing two or more different types of comparison operations is useful. In some embodiments, the versatile packed compare instructions/operations may be used to perform multi-conditional loads/moves involving two or more different types of comparison operations (e.g., two or more of equal to, greater than, less than, greater than or equal to, less than or equal to, etc.).

To further illustrate certain concepts, consider the following example of a multi-conditional load/move involving up to N potentially different types of comparison operations:

```
if(a cmp1 b1) { B = value1}
else if(a cmp2 b2) { B = value2}
...
else if(a cmpN bN) { B = valueN}
```

This example is intended to store one of an array of "values" (i.e., value1 through valueN) in a variable B depending upon a sequence of comparisons involving a parameter "a" and an array of values "bj" (i.e., b1 through bN). The loads/moves are subject to comparisons arranged in an "if—else if" dependency chain. Potentially N different comparison operations (cmp1 through cmpN) may need to be performed.

One challenge with implementing this multi-conditional load/move is that potentially different types of comparison operations (cmp1-cmpN) may be used. As discussed in the background section, known conventional packed compare instructions may allow only a single type of comparison operation to be performed on all pairs of corresponding data elements. As a result, multiple, or potentially many, different comparison instructions (e.g., up to N comparison instructions) may be needed. In addition, often such a multi-conditional load/move algorithm is implemented with at least one, or potentially many (e.g., up to N−1), conditional jumps, conditional branches, or other conditional movements within the code, depending on the outcomes of the comparisons. Potentially having to perform so many conditional jumps or conditional branches may tend to detract from performance (e.g., may cause stall of instruction pipeline). This may be especially true in cases where conditional branches are predicted incorrectly and speculative execution results need to be discarded.

Advantageously, the versatile packed compare instructions/operations disclosed herein may be used to eliminate such conditional jumps or conditional branches, which may help to significantly improve performance when implementing such multi-conditional loads/moves. The versatile packed compare instructions/operations may be used to perform multiple different types of comparison operations so that the comparisons conventionally relegated to different comparison instructions may be grouped together into the same single comparison instruction. Rather than performing multiple or potentially quite a few comparison instructions, a single comparison instruction may be performed. Compared to conventional conditional move instruction, which is generally able to choose between only two possible variants, an embodiment of the versatile packed compare instruction may in certain cases be able to chose between more than two, at least four, at least eight, or even more possible variants (e.g., a number of data elements in a source packed data operand).

The result operand stored by the single versatile packed compare instruction may then be used to load/move an appropriate value (e.g., load one of value1-valueN into the variable B depending on the evaluation of the comparisons). For example, the result may be used to determine an appropriate offset inside an array of values (e.g., value1-valueN) to load/move to the variable B. The array may contain all possible values for variable B in an ordered arrangement. Generally, either the first or lowest order "true: result indicator, or the last or highest order "true" result indicator, may indicate the appropriate offset. For example, in some cases the comparisons may be logically linked together in an if-elseif-elseif-elseif . . . or if-elseif . . . else type of arrangement. As an example, consider the following:

```
if(a cmp1 b1){B=value1;}
else if(a cmp2 b2){B=value2;}
else if(a cmp3 b3){B=value3;}
else{B=value4;}
```

In such cases, only first or lowest order "true" result indicator in the result operand would set the B value to the appropriate one of values1-value4. That is, only the first or lowest order "true" result indicator is needed to indicate the appropriate offset and/or value to move into the B parameter. In such a case, it may be more efficient to start from the first or lowest order bit of the result operand and work forwards. Alternatively, if the comparisons are logically linked together in an if-if-if-if . . . type of arrangement, then the last or highest order "true" result indicator in the result operand may be used to indicate the appropriate offset. Only the last or highest order true comparison may give the desired value to be loaded for such a scenario. In such a case, it may be more efficient to start from the last or highest order bit of the result operand and work backwards.

As mentioned above in FIG. 1, in some embodiments an instruction set of a processor may optionally include one or more conditional directional move instructions (e.g., instruction 104), although this is not required. In some embodiments, an embodiment of a conditional directional move instruction may move and/or load data based on a conditional and directional interpretation of a source operand (e.g., a result operand of an embodiment of a versatile packed data compare instruction). The interpretation is referred to as conditional because in some embodiments it depends on values of indicators of the source operand (e.g., result indicators of the result operand of the versatile packed data compare instruction). The interpretation is referred to as directional because in some embodiments the indicators of the source operand are moved through in a direction indicated by the conditional directional move instruction.

Figure 6:
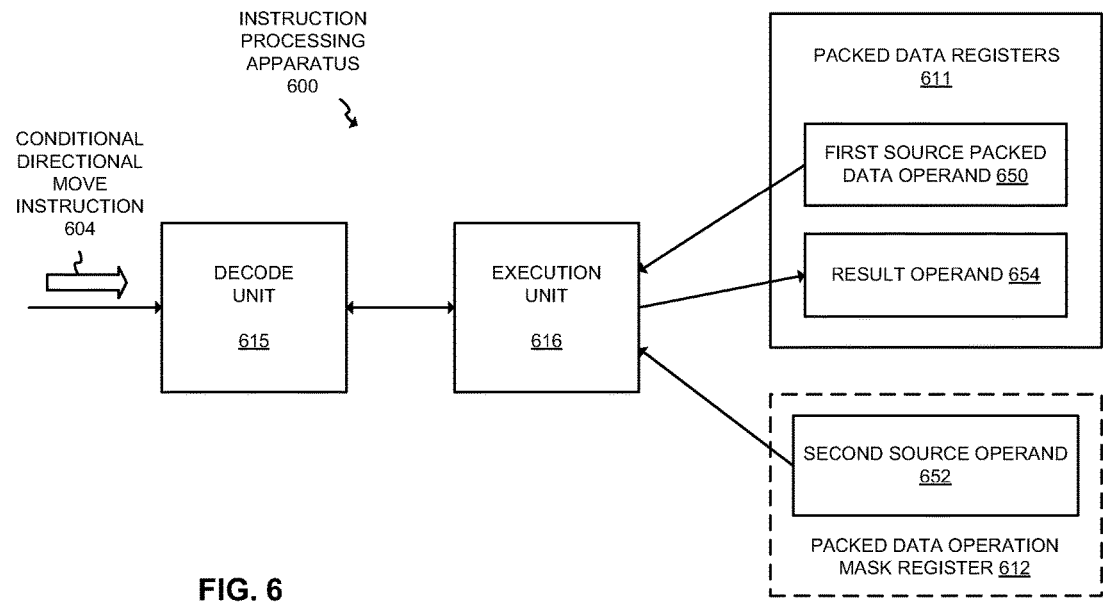
FIG. 6 is a block diagram of an embodiment of an instruction processing apparatus operable to perform an embodiment of a conditional directional move instruction.

FIG. 6 is a block diagram of an embodiment of an instruction processing apparatus 600 operable to perform an embodiment of a conditional directional move instruction 604. In embodiments, the apparatus may be a processor and/or may be included in a processor. For example, the apparatus may be, or may be included in, the processor of FIG. 1. The components, features, and specific optional details described herein for the processor of FIG. 1 also optionally apply to the apparatus. Alternatively, the apparatus may be, or may be included in, a similar or different processor. Moreover, the processor of FIG. 1 may include either a similar or different apparatus than the apparatus.

The apparatus 600 includes a decode unit 615, an execution unit 616, packed data registers 611, and in some embodiments a packed data operation mask register 612. Unless otherwise specified, the apparatus 600 and/or its components may optionally have some or all of the previously described characteristics of the apparatus 200 and/or correspondingly named components of FIG. 2. To avoid obscuring the description, the different and/or additional characteristics will primarily be described without repeating the common characteristics The apparatus 600 may receive the conditional directional move instruction 604. For example, the instruction may be received from an instruction fetch unit, an instruction queue, or the like. The conditional directional move instruction may explicitly specify or otherwise indicate (e.g., implicitly indicate) a first source packed data operand 650 that is to include a first plurality of data elements. The first source packed data operand may be stored in a packed data register, memory location, or other suitable storage location. In some embodiments, the first source packed data operand may be used to store an array of values associated with a complex conditional move/load operation only one of which is to be loaded into a given parameter. For example, considering the complex conditional move operations previously discussed above, the first source packed data operand may store an array of values (e.g., value1-valueN) only one of which is to be moved to a parameter (e.g., the parameter B) depending on the evaluation results of comparison operations.

The conditional directional move instruction may explicitly specify or otherwise indicate (e.g., implicitly indicate) a second source operand 652 that is to include a plurality of indicators each operable to indicate one of two possible conditions. By way of example, the indicators may each indicate true or false, set to binary one (i.e., 1) or cleared to binary zero (i.e., 0), yes or no, or the like. Each indicator of the second source operand may correspond to a different data element of the first source packed data in a corresponding relative position within the operands. In some embodiments, a result operand of the versatile packed data compare instruction may be indicated as the second source operand. In some embodiments, the second source operand may be stored in a packed data operation mask register 612. Alternatively, the second source operand may be a general-purpose register, a packed data register, or other storage location.

The conditional directional move instruction may explicitly specify or otherwise indicate (e.g., implicitly indicate) a direction to be used to move through the indicators of the second source operand. In some embodiments, the conditional directional move instruction may indicate to move through the indicators of the second source operand from most significant bit positions to least significant bit positions. In other embodiments, the conditional directional move instruction may indicate to move through the indicators of the second source operand from least significant bit positions to most significant bit positions. In some embodiments, the conditional directional move instruction may have a bit or field to indicate the direction (e.g., 0 may be used for one direction and 1 for the other). Alternatively, an instruction may have an implicit direction. For example, two instructions (e.g., two different opcodes) may each be used for a different one of the two directions.

The decode unit 615 may receive and decode the conditional directional move instruction 604. It is to be appreciated that, in some embodiments, instead of the instruction being provided directly to the decode unit, an instruction emulator, translator, morpher, interpreter, or other instruction conversion module may optionally be used, as previously described. The execution unit 616 is coupled with the decode unit 615 and the packed data registers 611. The execution unit may receive the first source packed data operand 650, and the second source operand 652 indicated by the conditional directional move instruction. The execution unit may be operable in response to and/or as a result of the conditional directional move instruction (e.g., in response to one or more instructions or control signals decoded from the instruction) to store a result operand 654 in a destination storage location (e.g., a packed data register) indicated by the instruction. In some embodiments, the result may include a data element of the first source packed data operand 650 that is to be indicated by a first indicator of the second source operand 652 having a given one of the two possible conditions encountered by moving through the indicators of the second source operand 652 in the direction that is indicated by the conditional directional move instruction.

Figure 7:
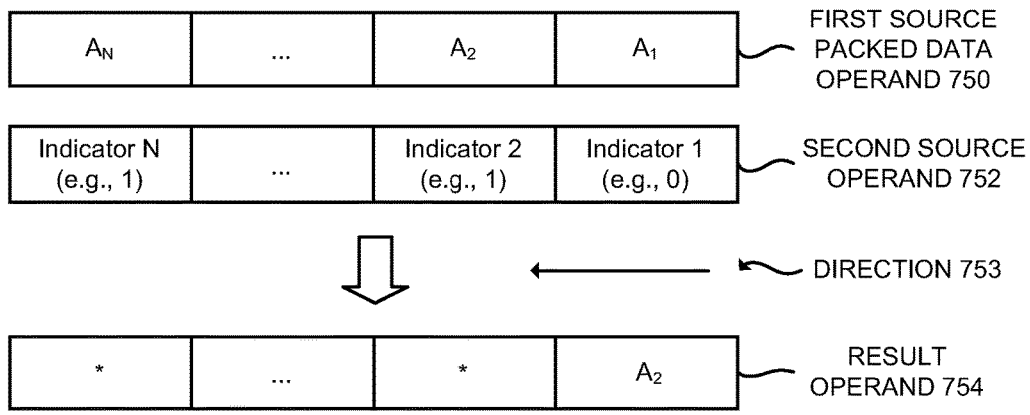
FIG. 7 is a block diagram of an embodiment of a conditional forward move operation.

FIG. 7 is a block diagram illustrating an embodiment of a conditional forward move operation 748 that may be performed in response to an embodiment of a conditional forward move instruction. The instruction may specify or otherwise indicate a first source packed data operand 750 including a first plurality of packed data elements $A_1$-$A_N$. The first source packed data operand and data elements may have any of the operand widths and data elements widths described elsewhere herein.

The instruction may specify or otherwise indicate a second source operand 752 including a second plurality of indicators (indicator 1-indicator N). Each data element in the first operand may correspond to a different indicator in the second operand in a corresponding relative position within the operands (e.g., $A_1$ may correspond to indicator 1, $A_2$ may correspond to indicator 2, etc.). In some embodiments, an indicator may have a value of binary one (i.e., "1") to reflect a "true" result, or may have a value of binary zero (i.e., "0") to reflect a "false" result. For example, in illustrated example, indicator 1 has a value of "0" to reflect "false," indicator 2 has a value of "1" to reflect "true," and indicator N has a value of "1" also to reflect "true," although this is only one example. In some embodiments, each indicator may be a single bit in a packed data operation mask register, although the scope of the invention is not so limited.

The conditional forward move operation is referred to as being "forward" to reflect that the instruction indicates to move through the indicators of the second source operand from least significant bit position (on the right in the illustration) to most significant bit position (on the left in the illustration). This "forward" aspect may be explicitly specified by one or more bits or a field of the instruction, or may be implicit to the instruction.

A result operand 754 may be generated (e.g., by an execution unit) and stored in a destination storage location in response to the conditional forward move instruction. The destination storage location may be specified or otherwise indicated by the instruction. In some embodiments, the destination storage location may be a packed data register. Alternatively, memory storage locations, general-purpose registers, or other storage locations may be used. In some embodiments, the result operand may include a data element of the first source packed data operand 750 that is to be indicated by a first encountered indicator of the second source operand 752 having a given one of two possible conditions (e.g., a "true" condition as opposed to a "false" condition) that has been encountered by moving through the indicators of the second source operand 752 in the forward direction (i.e., from least significant bit position (on the right in the illustration) to most significant bit position (on the left in the illustration)) indicated by the conditional directional move instruction. In the illustrated example, the result operand 754 stores the data element A2, since when moving from right to left across the second source operand the indicator 1 has a value of "0" to reflect "false," but the indicator 2 has a value of "1" to reflect "true." That is, the indicator 2 is the first encountered indicator having a "true" condition when moving in the forward direction across the second source operand.

Figure 8:
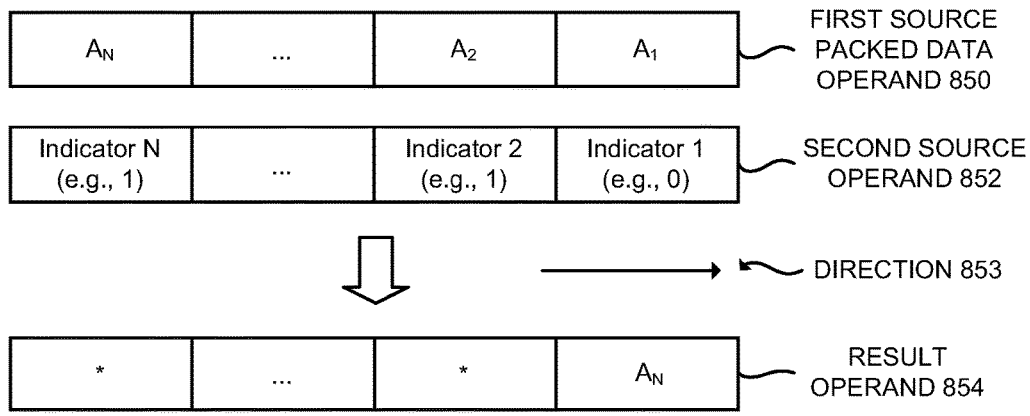
FIG. 8 is a block diagram of an embodiment of a conditional backward move operation.

FIG. 8 is a block diagram illustrating an embodiment of a conditional backward move operation 860 that may be performed in response to an embodiment of a conditional backward move instruction. The backward operation of FIG. 8 has certain similarities to the forward operation of FIG. 7. To avoid obscuring the description, the different and/or additional characteristics for the backward operation of FIG. 8 will primarily be described without repeating all the similar or common characteristics relative to the forward operation of FIG. 7. However, it is to be appreciated that the previously described characteristics and details of the forward operation may also optionally apply to FIG. 8 unless clearly apparent otherwise.

The instruction may specify or otherwise indicate a first source packed data operand 850 including a first plurality of packed data elements $A_1$-$A_N$. The instruction may specify or otherwise indicate a second source operand 852 including a second plurality of indicators (indicator 1-indicator N). As before, each data element in the first operand may correspond to a different indicator in the second operand in a corresponding relative position within the operands.

The conditional backward move operation is referred to as being "backward" to reflect that the instruction indicates to move through the indicators of the second source operand from most significant bit position (on the left in the illustration) to least significant bit position (on the right in the illustration). This "backward" aspect may be explicitly specified by one or more bits or a field of the instruction, or may be implicit to the instruction.

A result operand 854 may be generated (e.g., by an execution unit) and stored in a destination storage location in response to the conditional backward move instruction. In some embodiments, the result operand may include a data element of the first source packed data operand 850 that is to be indicated by a first encountered indicator of the second source operand 852 having a given one of two possible conditions (e.g., a "true" condition as opposed to a "false" condition) that has been encountered by moving through the indicators of the second source operand 852 in the backward direction 853 (i.e., from most significant bit position (on the left in the illustration) to least significant bit position) indicated by the conditional directional move instruction. In the illustrated example, the result operand 854 stores the data element AN, since when moving from left to right across the second source operand the indicator N has a value of "1" to reflect "true." That is, the indicator N is the first encountered indicator when moving in the backward direction across the second source operand with a "true" indication.

Listed below is pseudocode for a particular example embodiment of a conditional forward move instruction named VCONDFWMOVE. The zmm1 and zmm2 correspond to 512-bit packed data registers. The zmm2 may provide a first source packed data operand. Alternatively, the first source packed data operand may be taken from memory. The xmm1 may store a result operand that contains loaded scalar result. In alternate embodiments, other storage locations may be used for the first source packed data operand and/or result operand. The operand k1 corresponds to a packed data operation mask register that is used to store a second source operand having individual bits as indicators. In other embodiments, a general-purpose register or other storage location may be used. In the code, "j" is a position counter within the operands, KL is the number of positions within the operands. The data elements may be byte, word, doubleword, quadword, single precision, or double precision, to name a few examples.

```
VCONDFWMOVE xmm1,k1,zmm2/mem64
for(j=0; j<KL; j++){
  if(k1[j]){
    offset = j ;
    dest = src[offset];
    break; } }
```

Listed below is pseudocode for a particular example embodiment of a conditional backward move instruction named VCONDBWMOVE.

```
VCONDBWMOVE xmm1,k1,zmm2/mem64
for(j=KL-1; j>=0; j--){
  if(k1[j]){
    offset = j ;
    dest = src[offset];
    break; } }
```

In other embodiments, an instruction may optionally integrate/incorporate a versatile packed data compare operation along with a conditional directional move operation within the execution of the single instruction. In some embodiments, rather than storing a result operand for the versatile packed data compare operation in an architectural register, the conditional directional move operation may directly use the results of the comparison operations to perform the conditional directional move operation.

Listed below is pseudocode for a particular example embodiment of a versatile packed data compare and conditional forward (i.e., directional) move instruction named VCMPGENFWMOVE. The zmm1, zmm2, and zmm3 correspond to 512-bit packed data registers. Alternatively, memory locations or other storage locations may optionally be used instead for one or more of these operands. The zmm1 and zmm2 are used to provide first and second source packed data operands to be compared by the versatile packed data compare operation. An immediate (imm) represents a source comparison operation indication operand for the versatile packed data compare operation. Alternatively, another register may be specified or implicit to provide the source comparison operation indication operand. The "Op" refers to a comparison operation specified by the source comparison operation indication operand. The k2 corresponds to a packed data operation mask (e.g., a packed data operation mask register) that is used as a predication or conditional control mask. The zmm3 is used to provide data that is loaded into zmm1, which is also used as the destination storage location for the result operand of the instruction. The data element of zmm3 indicated by the offset determined by the conditional forward move operation is moved into the least significant data element position in zmm1. In the code, "j" is a position counter within the operands, KL is the number of positions within the operands, FS is the number of bits used to encode the comparison operations (e.g., field size inside the immediate operand). In other embodiments, other widths besides 512-bit widths may optionally be used. The data elements may be byte, word, doubleword, quadword, single precision, or double precision, to name a few examples.

```
VCMPGENFWMOVE k2, zmm1, zmm2, zmm3/mem64, imm
for(j=0; j<KL; j++){
  if(k2[j]){
    Op=imm[j*FS+FS-1:j*FS];
    if(zmm1[j] Op zmm2[j]){
      offset=j;
      zmm1[0] = zmm3[offset];
      break; } } }
```

Listed below is pseudocode for a particular example embodiment of a versatile packed data compare and conditional backward (i.e., directional) move instruction named VCMPGENBWMOVE.

```
VCMPGENBWMOVE k2, zmm1, zmm2, zmm3/mem64, imm
for(j=KL-1; j>=0; j--){
  if(k2[j]){
    Op=imm[j*FS+FS-1:j*FS];
    if(zmm1[j] Op zmm2[j]){
      offset=j;
      zmm1[0] = zmm3[offset];
      break; } } }
```

One possible advantage of combining the versatile packed data compare operation and the conditional directional move operation within the execution of the single instruction is enhanced performance. It is generally not required to store a result operand of the compare operation in an architectural register and then move through all the result indicators. Rather, since either the first or last true result indicator may be the desired one to load/move the desired data element, it may merely be identified and then the load/move can be performed directly without delay. Conversely, one possible advantage of separating the versatile packed data compare operation and the conditional directional move operation into different instructions may be enhanced flexibility and/or generality. For example, the versatile packed data compare operation may be used for other purposes besides just conditional directional move operation, and vice versa.

Figure 9:
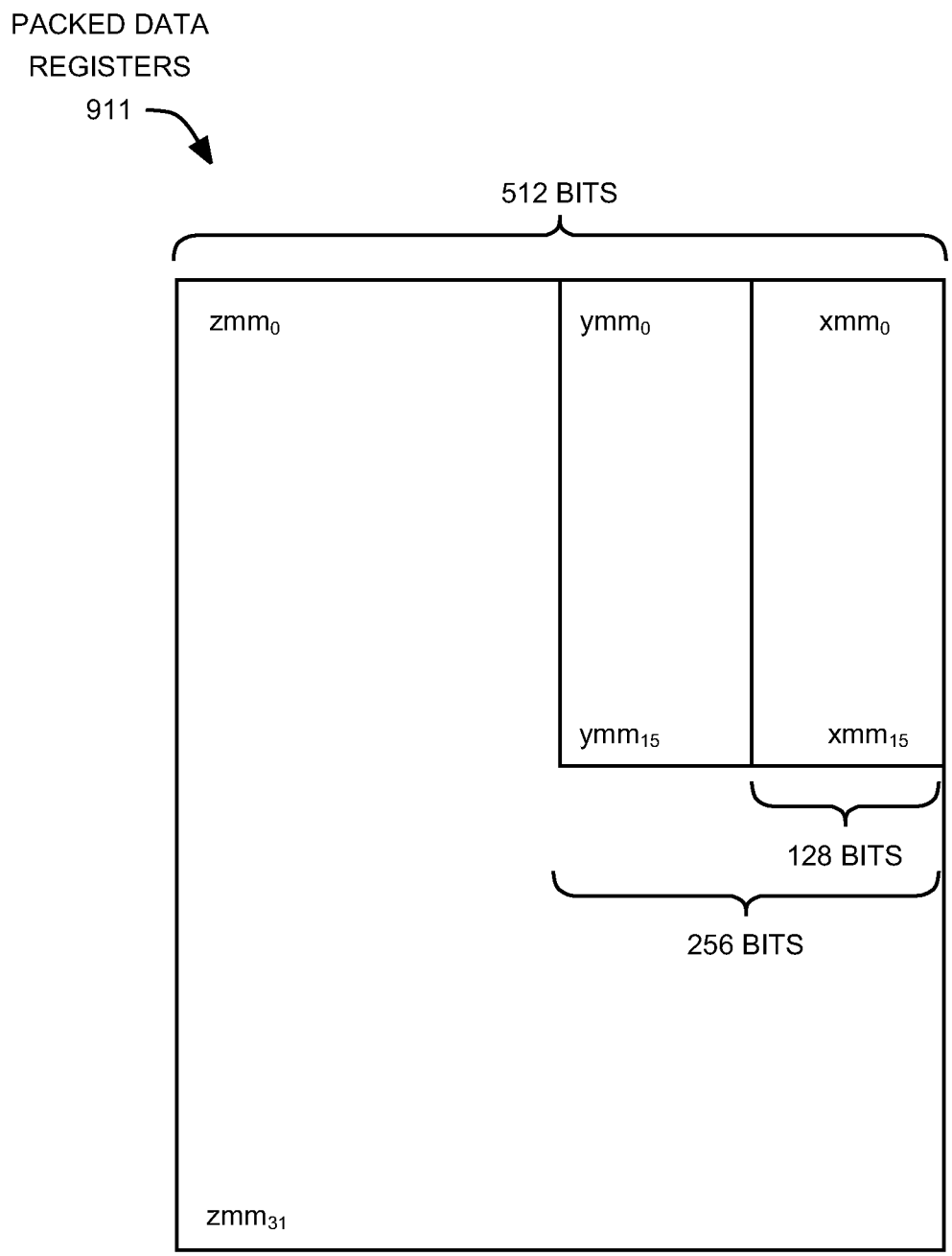
FIG. 9 is a block diagram of an example embodiment of a suitable set of packed data registers.

FIG. 9 is a block diagram of an example embodiment of a suitable set of packed data registers 911. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

Figure 10:
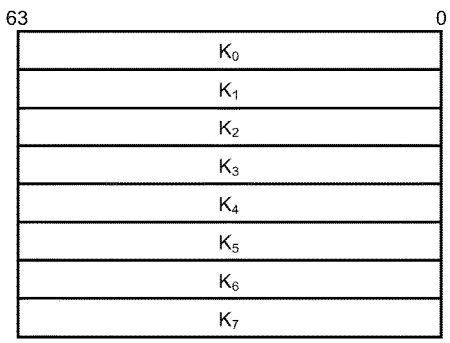
FIG. 10 is a block diagram of an example embodiment of a suitable set of packed data operation mask registers.

FIG. 10 is a block diagram of an example embodiment of a suitable set of packed data operation mask registers 1012. Each of the packed data operation mask registers may be used to store a packed data operation mask. In the illustrated embodiment, the set includes eight registers labeled k0 through k7. Alternate embodiments may include either fewer than eight registers (e.g., two, four, six, etc.), or more than eight registers (e.g., sixteen, thirty-two, etc.). In the illustrated embodiment, each of the registers is 64-bits. In alternate embodiments, the widths of the registers may be either wider than 64-bits (e.g., 80-bits, 128-bits, etc.), or narrower than 64-bits (e.g., 8-bits, 16-bits, 32-bits, etc). The registers may be implemented in different ways using well known techniques and are not limited to any known particular type of circuit. Examples of suitable registers include, but are not limited to, dedicated physical registers, dynamically allocated physical registers using register renaming, and combinations thereof. In some embodiments, the instructions may encode or specify the packed data operation mask registers in different bits or one or more different fields of an instruction format than those used to encode or specify other types of registers (e.g., packed data registers). By way of example, an instruction may use three bits (e.g., a 3-bit field) to encode or specify any one of the eight packed data operation mask registers k0 through k7. In alternate embodiments, either fewer or more bits may be used, respectively, when there are fewer or more packed data operation mask registers.

Figure 11:
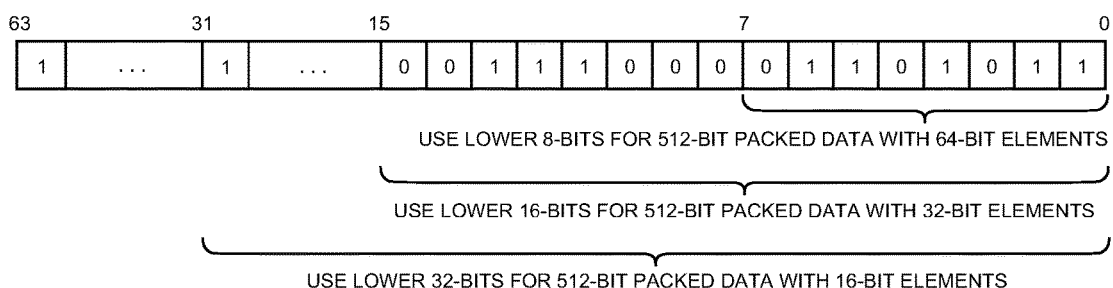
FIG. 11 is a diagram illustrating an example embodiment of a packed data operation mask register showing that the number of bits that are used as a packed data operation mask depends upon the packed data width and the data element width.

FIG. 11 is a diagram illustrating an example embodiment of a packed data operation mask register 1112 and showing that the number of bits that are used as a packed data operation mask and/or for masking depends upon the packed data width and the data element width. The illustrated example embodiment of the packed data operation mask register is 64-bits wide, although this is not required. Depending upon the combination of the packed data width and the data element width, either all 64-bits, or only a subset of the 64-bits, may be used as a packed data operation mask for masking. Generally, when a single, per-element masking control bit is used, the number of bits in the packed data operation mask register that are used for masking is equal to the packed data width in bits divided by the packed data element width in bits. In the illustrated embodiment, the lowest-order subset or portion of the register is used for masking, although this is not required. In alternate embodiments a highest-order subset, or some other subset, may optionally be used. Moreover, in the illustrated embodiment, only a 512-bit packed data width is considered, however the same principle applies for other packed data widths, such as, for example, 256-bit and 128-bit widths. As previously mentioned, the use of a 64-bit packed data operation mask register is not required.

Components, features, and details described for any of FIGS. 4-5 and 9-11 may also optionally be used in any of FIGS. 1-3. Components, features, and details described for any of FIGS. 7-11 may also optionally be used in any of FIG. 1 or 6. Moreover, components, features, and details described herein for any of the apparatus described herein may also optionally be used in and/or apply to any of the methods described herein, which in embodiments may be performed by and/or with such apparatus. Further, components, features, and details described herein for any of the processors or instruction processing apparatus described herein may also optionally be used in and/or apply to any of the systems described herein.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}*\text{index}+\text{base}$).

Displacement Field 1262A—its content is used as part of memory address generation (e.g., for address generation that uses $2^{scale}*\text{index}+\text{base}+\text{displacement}$).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13A is a block diagram illustrating an exemplary specific vector friendly instruction format according to embodiments of the invention. FIG. 13A shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12A into which the fields from FIG. 13A map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]-R), EVEX.X bit field (EVEX byte 1, bit [6]-X), and 1257BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1272 operates as previously described.
Full Opcode Field

Figure 13D:
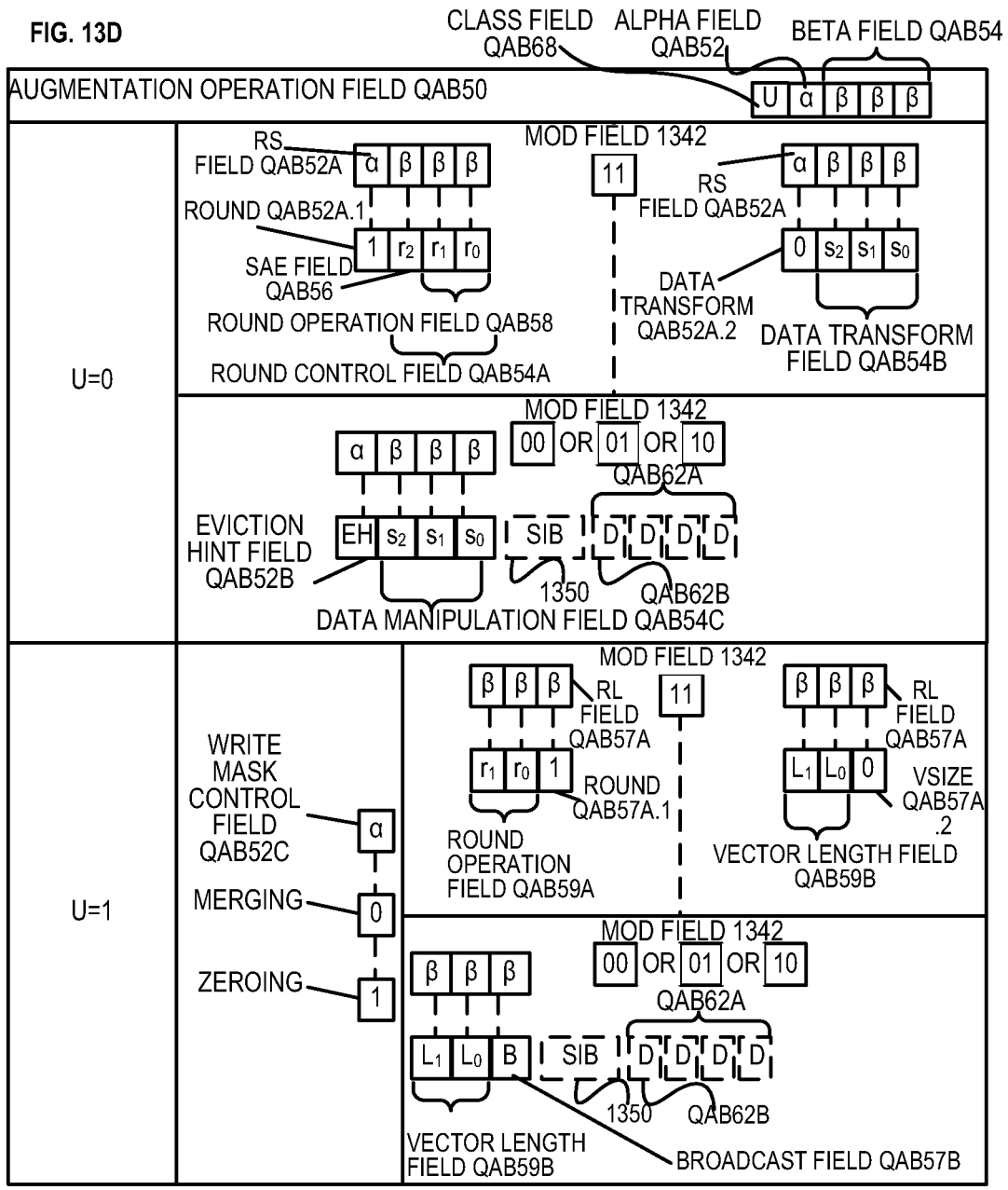
FIG. 13D is a block diagram illustrating the fields of the specific vector friendly instruction format 1300 that make up the augmentation operation field according to one embodiment of the invention.

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.
Register Index Field FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.
Augmentation Operation Field FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]-SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]-SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]-SSS) is interpreted as a three bit data manipulation field 1254C. When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]-$S_0$) is interpreted as the RL field 1257A; when it contains a 1 (round 1257A.1) the rest of the beta field 1254 (EVEX byte 3, bit [6-5]-$S_{2-1}$) is interpreted as the round operation field 1259A, while when the RL field 1257A contains a 0 (VSIZE 1257.A2) the rest of the beta field 1254 (EVEX byte 3, bit [6-5]-$S_{2-1}$) is interpreted as the vector length field 1259B (EVEX byte 3, bit [6-5]-$L_{1-0}$). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-$L_{1-0}$) and the broadcast field 1257B (EVEX byte 3, bit [4]-B).
Exemplary Register Architecture FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
| --- | --- | --- | --- |
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order core block diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-order Core Architecture

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Processor with Integrated Memory Controller and Graphics

Figure 17:
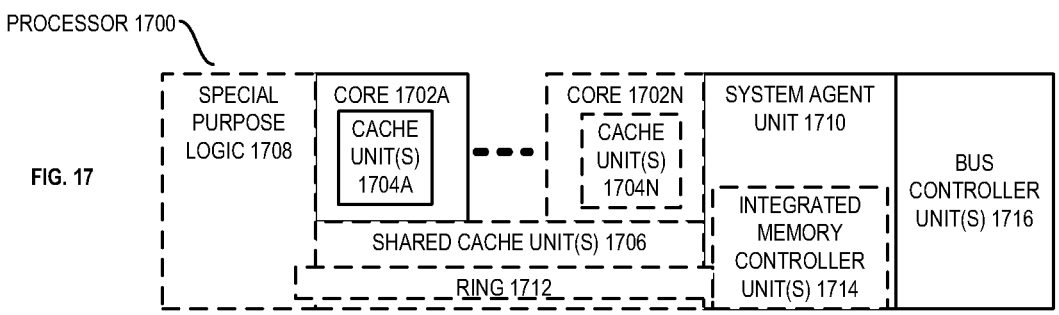
FIG. 17 is a block diagram of a processor that may have more than one core, may have an integrated memory controller, and may have integrated graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708, the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
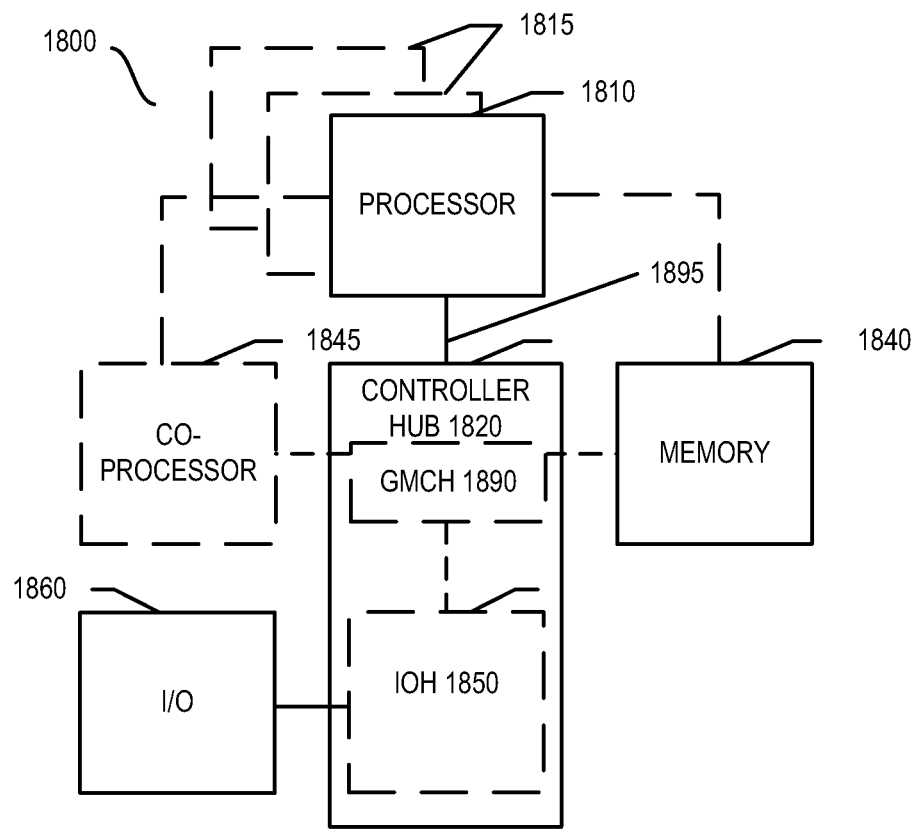
FIG. 18 shown is a block diagram of a system in accordance with one embodiment of the present invention.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 is couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
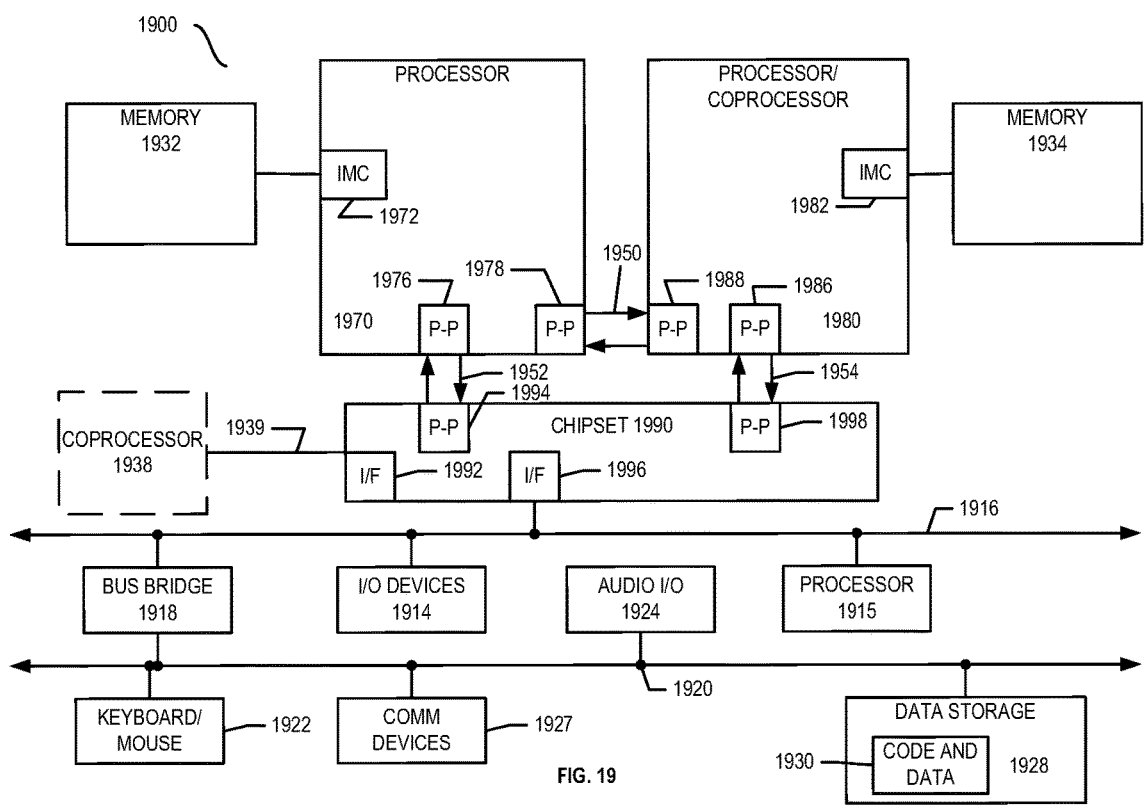
FIG. 19 shown is a block diagram of a first more specific exemplary system in accordance with an embodiment of the present invention.

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
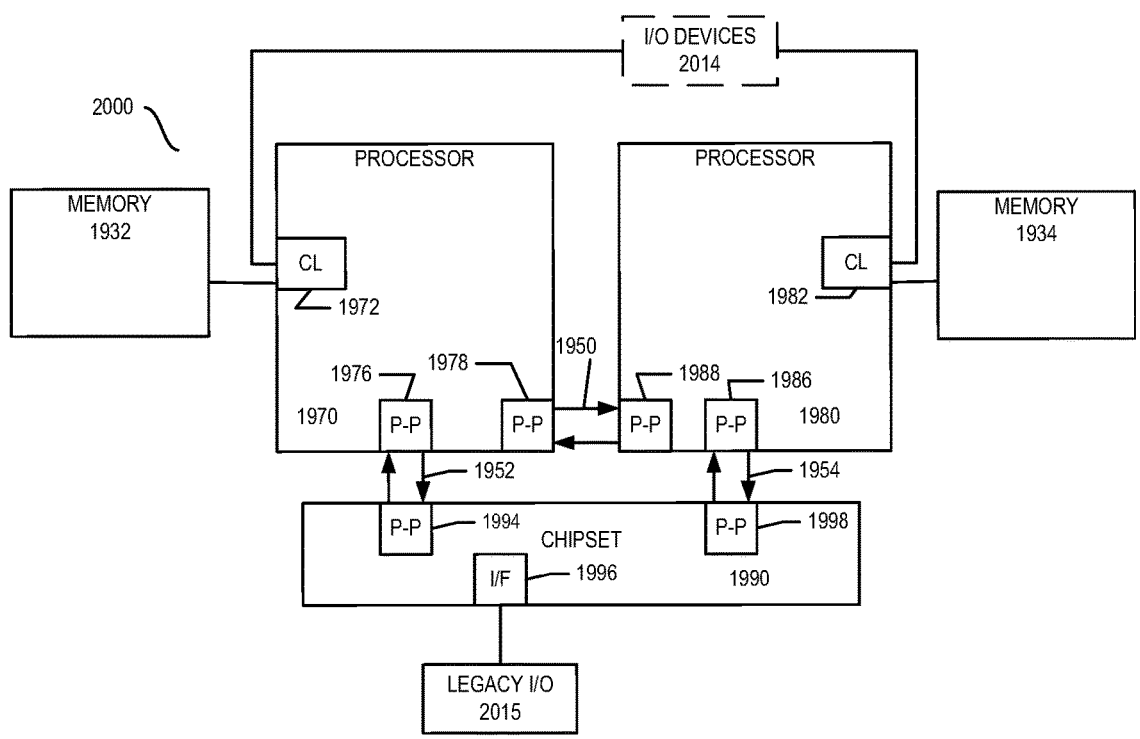
FIG. 20 shown is a block diagram of a second more specific exemplary system in accordance with an embodiment of the present invention.

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
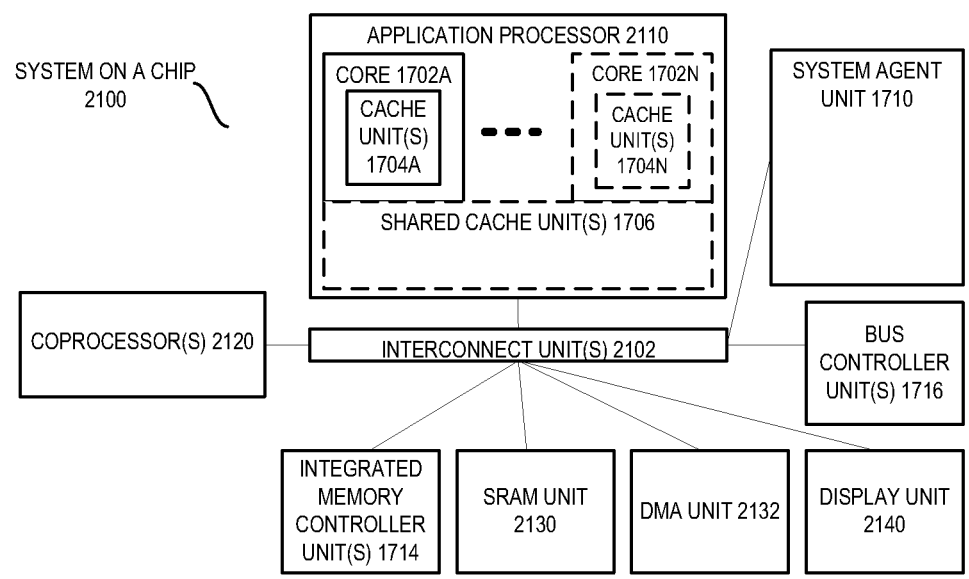
FIG. 21 shown is a block diagram of a SoC in accordance with an embodiment of the present invention.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 202A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
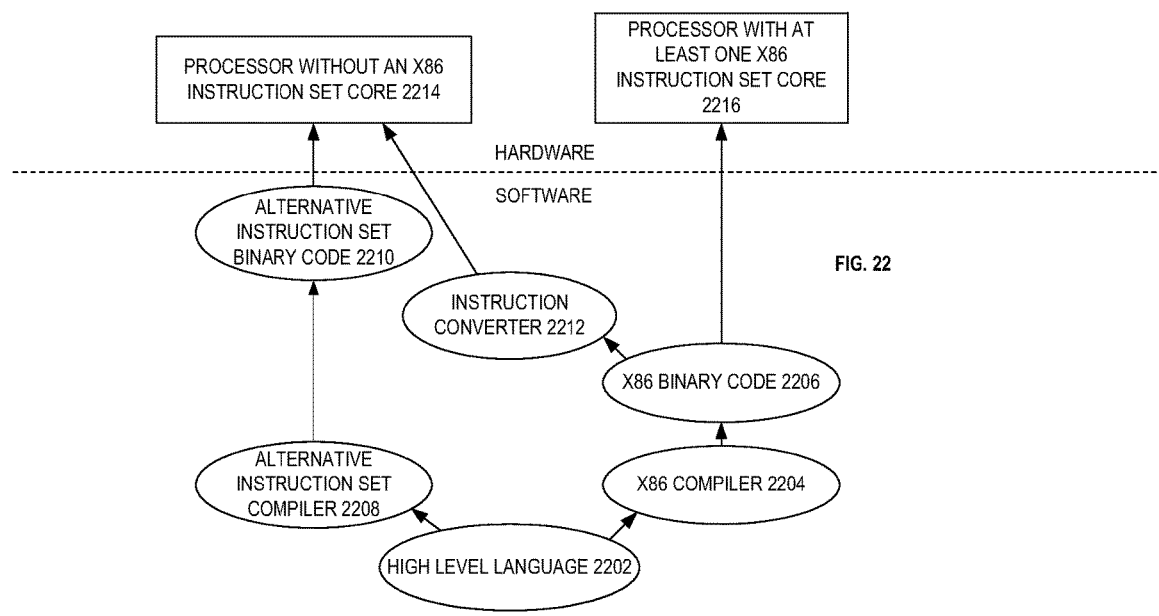
FIG. 22 is a block diagram contrasting the use of a software instruction converter to convert binary instructions in a source instruction set to binary instructions in a target instruction set according to embodiments of the invention.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein. Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a decode unit to decode a versatile packed data compare instruction. The versatile packed data compare instruction is to indicate a first source packed data operand that is to include a first plurality of data elements, and to indicate a second source packed data operand that is to include a second plurality of data elements. Each data element of the second plurality is to correspond to a data element of the first plurality in a corresponding relative position. The instruction is also to indicate a source comparison operation indication operand that is to include a plurality of comparison operation indicators each operable to indicate a potentially different comparison operation for a different corresponding pair of corresponding data elements from the first and second source packed data operands. An execution unit of the processor or apparatus is coupled with the decode unit. The execution unit, in response to the versatile packed data compare instruction, is to store a result in a destination storage location to be indicated by the versatile packed data compare instruction. The result is to include a plurality of result indicators that are each to correspond to a different one of the comparison operation indicators. Each result indicator is to indicate a result of a comparison operation, which is indicated by the corresponding comparison operation indicator, which has been performed on the corresponding pair of data elements from the first and second source packed data operands.

Example 2 includes the processor of Example 1 and optionally in which the source comparison operation indication operand is to include at least three comparison operation indicators each operable to indicate a potentially different comparison operation selected from any of at least equal to, greater than, and less than.

Example 3 includes the processor of any preceding example and optionally in which the source comparison operation indication operand is to include a packed data operand that is to include a plurality of data elements that are each to include a different one of the comparison operation indicators.

Example 4 includes the processor of any preceding example and optionally in which each comparison operation indicator is to be specified in a least significant byte of a corresponding data element.

Example 5 includes the processor of Example 1 and optionally in which the source comparison operation indication operand includes an immediate that is to include a different subset of one or more bits for each of the different comparison operation indicators.

Example 6 includes the processor of any preceding example and optionally in which the execution unit is to store the result in a packed data operation mask register to be indicated by the versatile packed data compare instruction. Also optionally in which the packed data operation mask register is also to be used by the processor to store packed data operation masks to predicate packed data operations.

Example 7 includes the processor of Example 1 and optionally in which the execution unit is to store the result in a general-purpose register that is to be indicated by the versatile packed data compare instruction.

Example 8 includes the processor of any preceding example and optionally in which the decode unit is to decode a masked versatile packed data compare instruction that is to indicate a source packed data operation mask that is to include a plurality of mask elements. Each mask element is to correspond to a different corresponding pair of corresponding data elements from the first and second source packed data operands. Each mask element operable to predicate performance of the corresponding comparison operation on the corresponding pair of the corresponding data elements from the first and second source packed data operands.

Example 9 includes the processor of any preceding example and optionally in which the execution unit is to set a first flag when at least one comparison operation performed on at least one corresponding pair of corresponding data elements is true.

Example 10 includes the processor of any preceding example and optionally in which in which the execution unit is to clear a second flag when no comparison operations performed on corresponding pairs of corresponding data elements are true.

Example 11 is a method in a processor or other apparatus that includes receiving a versatile packed data compare instruction. The versatile packed data compare instruction indicating a first source packed data operand including a first plurality of data elements, and indicating a second source packed data operand including a second plurality of data elements. Each data element of the second plurality corresponding to a data element of the first plurality in a corresponding relative position. The instruction also indicating a source comparison operation indication operand including a plurality of comparison operation indicators indicating at least two different comparison operations for at least two different corresponding pairs of corresponding data elements from the first and second source packed data operands. The method also includes storing a result in a destination storage location in response to the versatile packed data compare instruction. The destination storage location indicated by the versatile packed data compare instruction. The result including a plurality of result indicators that each correspond to a different one of the comparison operation indicators. Each result indicator indicating a result of a comparison operation, which is indicated by the corresponding comparison operation indicator, which has been performed on the corresponding pair of data elements the first and second source packed data operands.

Example 12 includes the method of any preceding example and optionally in which receiving includes receiving the instruction indicating the source comparison operation indication operand indicating at least three different comparison operations selected from equal to, greater than, greater than or equal to, less than, and less than or equal to.

Example 13 includes the method of any preceding example and optionally in which receiving includes receiving the instruction having an immediate as the source comparison operation indication operand, the immediate including a different subset of one or more bits each, for each of the different comparison operation indicators.

Example 14 includes the method of Example 11 and optionally in which receiving includes receiving the instruction indicating the source comparison operation indication operand which is a packed data operand that includes a plurality of data elements that each include a different one of the comparison operation indicators.

Example 15 includes the method of any preceding example and optionally in which storing includes storing the result in a packed data operation mask register indicated by the versatile packed data compare instruction.

Example 16 includes the method of Example 11 and optionally in which storing includes storing the result in a general-purpose register indicated by the versatile packed data compare instruction.

Example 17 includes the method of any preceding example and optionally further including setting a first flag after determining that at least one comparison operation performed on at least one corresponding pair of corresponding data elements is true.

Example 18 includes the method of any preceding example and optionally further including clearing a second flag after determining that no comparison operations performed on corresponding pairs of corresponding data elements are true.

Example 19 includes the method of any preceding example and optionally in which receiving includes receiving a masked versatile packed data compare instruction that indicates a source packed data operation mask that includes a plurality of mask elements. Each mask element corresponds to a different corresponding pair of corresponding data elements from the first and second pluralities of data elements. Each mask element is to predicate performance of a corresponding comparison operation on the corresponding pair of corresponding data elements from the first and second pluralities of data elements.

Example 20 includes the method of any preceding example and optionally in further including determining a value in an array of values based on an offset corresponding to the value that is indicated by one of a most significant result indicator and a least significant result indicator of the result that indicates the corresponding comparison operation on the corresponding pair of data elements is true. The determined value is loaded into a variable.

Example 21 is a system that includes an interconnect and a processor coupled with the interconnect. The processor is to receive a versatile packed data compare instruction. The versatile packed data compare instruction is to indicate a first source packed data operand that is to include a first plurality of data elements, and to indicate a second source packed data operand that is to include a second plurality of data elements. Each data element of the second plurality is to correspond to a data element of the first plurality in a corresponding relative position. The instruction is also to indicate a source comparison operation indication operand that is to include a plurality of comparison operation indicators each operable to indicate a potentially different comparison operation for a different corresponding pair of corresponding data elements from the first and second source packed data operands. The processor is operable, in response to the versatile packed data compare instruction to store a result in a destination storage location to be indicated by the versatile packed data compare instruction. The result is to include a plurality of result indicators that are each to correspond to a different one of the comparison operation indicators. Each result indicator is to indicate a result of a comparison operation, which is indicated by the corresponding comparison operation indicator, which has been performed on the corresponding pair of data elements from the first and second source packed data operands. The system also includes a dynamic random access memory (DRAM) coupled with the interconnect. The DRAM is to store a set of instructions to implement a conditional load algorithm using the versatile packed data compare instruction. The conditional move algorithm is to store an array of values in one of the source packed data operands of the versatile packed data compare instruction, and load one of the array of values into a parameter based on the result stored in response to the versatile packed data compare instruction.

Example 22 includes the system of Example 21 and optionally in which the source comparison operation indication operand is to include at least three comparison operation indicators each operable to indicate a potentially different comparison operation selected from any of at least equal to, greater than, and less than.

Example 23 includes an article of manufacture that includes a non-transitory machine-readable storage medium. The non-transitory machine-readable storage medium stores a versatile packed data compare instruction. The versatile packed data compare instruction is to indicate a first source packed data operand that is to include a first plurality of data elements, and to indicate a second source packed data operand that is to include a second plurality of data elements. Each data element of the second plurality is to correspond to a data element of the first plurality in a corresponding relative position. The instruction is also to indicate a source comparison operation indication operand that is to include a plurality of comparison operation indicators to indicate at least two different comparison operations for at least two different corresponding pairs of corresponding data elements from the first and second source packed data operands. The versatile packed data compare instruction if executed by a machine operable to cause the machine to perform operations including storing a result in a destination storage location in response to the versatile packed data compare instruction. The destination storage location to be indicated by the versatile packed data compare instruction. The result to include a plurality of result indicators that each are to correspond to a different one of the comparison operation indicators. Each result indicator is to indicate a result of a comparison operation, which is to be indicated by the corresponding comparison operation indicator, which is to be performed on the corresponding pair of data elements the first and second source packed data operands.

Example 24 includes the article of Example 23 and optionally in which the source comparison operation indication operand is to include at least three comparison operation indicators each operable to indicate a potentially different comparison operation selected from any of at least equal to, greater than, and less than.

Example 25 includes a processor or other apparatus that is operable to perform the method of any of Examples 11-20.

Example 26 includes a processor or other apparatus that includes means for performing the method of any of Examples 11-20.

Example 27 includes a processor that includes modules, units, logic, circuitry, means, or any combination thereof, to perform the method of any of Examples 11-20.

Example 28 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 11-20.

Example 29 includes an optionally non-transitory machine-readable medium that optionally stores or otherwise provides an instruction that if and/or when executed by a processor, computer system, or other machine is operable to cause the machine to perform the method of any of Examples 11-20.

Example 30 includes a processor or other apparatus that is operable to perform one or more operations or any method substantially as described herein.

Example 31 includes a processor or other apparatus including means for performing one or more operations or any method substantially as described herein.

Example 32 includes a processor or other apparatus that is operable to perform any of the instructions substantially as described herein.

Example 33 includes a processor or other apparatus including means for performing any of the instructions substantially as described herein.

Example 34 includes a method that includes converting a first instruction, which may be any of the instructions substantially as disclosed herein, and which is of a first instruction set, into one or more instructions of a second instruction set. The method also includes decoding and executing the one or more instructions of the second instruction set on a processor. The executing includes storing a result in a destination. The result may include any of the results substantially as disclosed herein for the first instruction.

Example 35 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 36 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

Example 37 includes a processor that includes a decode unit to decode an instruction that is to indicate a first source packed data operand to include a first plurality of data elements, a second source packed data operand to include a second plurality of corresponding data elements, and a source comparison operation indication operand that is to include a plurality of comparison operation indicators each operable to indicate a potentially different comparison operation for a different corresponding pair of corresponding data elements. The processor also includes an execution unit coupled with the decode unit. The execution unit, in response to the instruction, to store a result in a destination storage location to be indicated by the instruction. The result to include a plurality of result indicators that are each to correspond to a different one of the comparison operation indicators. Each result indicator to indicate a result of a comparison operation, indicated by the corresponding comparison operation indicator, which has been performed on the corresponding pair of data elements from the first and second source packed data operands.

Example 38 includes the processor of Example 37 in which the plurality of comparison operation indicators comprises at least three comparison operation indicators.

What is claimed is:

1. A processor comprising:
a decode unit to decode a versatile packed data compare instruction, the versatile packed data compare instruction to indicate a first source packed data operand that is to include at least four data elements, to indicate a second source packed data operand that is to include at least four data elements, each data element of the second source packed data operand to correspond to a data element of the first source packed data operand in a same relative position, and to indicate a source comparison operation indication operand that is to include at least four comparison operation indicators each operable to versatilely indicate a potentially different comparison operation for a different corresponding pair of corresponding data elements from the first and second source packed data operands, wherein the source comparison operation indication operand comprises a packed data operand that is to include at least four data elements that are each to include a different corresponding one of the comparison operation indicators, and wherein each comparison operation indicator is to be specified in a least significant byte of the corresponding data element; and an execution unit coupled with the decode unit, the execution unit, in response to the versatile packed data compare instruction, to store a result in a destination storage location to be indicated by the versatile packed data compare instruction, the result to include at least four result indicators that are each to correspond to a different one of the at least four comparison operation indicators, each result indicator to indicate a result of a comparison operation, which is to be indicated by the corresponding comparison operation indicator, which is to have been performed on the corresponding pair of data elements from the first and second source packed data operands.

2. The processor of claim 1, wherein the source comparison operation indication operand is to include the at least four comparison operation indicators each operable to indicate a potentially different comparison operation selected from any of at least equal to, greater than, and less than.

3. The processor of claim 1, wherein the execution unit is to store the result in a packed data operation mask register to be indicated by the versatile packed data compare instruction, and wherein the packed data operation mask register is also to be used by the processor to store packed data operation masks to predicate packed data operations.

4. The processor of claim 1, wherein the execution unit is to store the result in a general-purpose register that is to be indicated by the versatile packed data compare instruction.

5. The processor of claim 1, wherein the decode unit is to decode the instruction which is a masked versatile packed data compare instruction that is to indicate a source packed data operation mask that is to include a plurality of mask elements, each mask element to correspond to a different pair of corresponding data elements from the first and second source packed data operands, each mask element operable to predicate performance of the corresponding comparison operation on the corresponding pair of the corresponding data elements from the first and second source packed data operands.

6. The processor of claim 1, wherein the execution unit is to set a first flag when at least one comparison operation to be performed on at least one corresponding pair of corresponding data elements is true.

7. The processor of claim 6, wherein the execution unit is to clear a second flag when no comparison operations to be performed on corresponding pairs of corresponding data elements are true.

8. A method in a processor, the method comprising:
receiving a versatile packed data compare instruction, the versatile packed data compare instruction indicating a first source packed data operand including at least four data elements, indicating a second source packed data operand including at least four data elements, each data element of the second source packed data operand corresponding to a data element of the first source packed data operand in a same relative position, and indicating a source comparison operation indication operand including at least four comparison operation indicators versatilely indicating at least two different comparison operations for at least four different corresponding pairs of corresponding data elements from the first and second source packed data operands; and storing a result in a destination storage location in response to the versatile packed data compare instruction, the destination storage location indicated by the versatile packed data compare instruction, the result including at least four result indicators that each correspond to a different one of the at least four comparison operation indicators, each result indicator indicating a result of a comparison operation, which is indicated by the corresponding comparison operation indicator, which has been performed on the corresponding pair of data elements from the first and second source packed data operands;

determining a value in an array of values based on an offset corresponding to the value that is indicated by one of a most significant result indicator and a least significant result indicator of the result that indicates the corresponding comparison operation on the corresponding pair of data elements is true; and loading the determined value into a variable.

9. The method of claim 8, wherein receiving comprises receiving the instruction indicating the source comparison operation indication operand indicating at least three different comparison operations selected from equal to, greater than, greater than or equal to, less than, and less than or equal to.

10. The method of claim 8, wherein receiving comprises receiving the instruction having an immediate as the source comparison operation indication operand, the immediate including a different subset of one or more bits each, for each of the different comparison operation indicators.

11. The method of claim 8, wherein receiving comprises receiving the instruction indicating the source comparison operation indication operand which is a packed data operand that includes at least four data elements that each include a different one of the comparison operation indicators.

12. The method of claim 8, wherein storing comprises storing the result in a packed data operation mask register indicated by the versatile packed data compare instruction.

13. The method of claim 8, wherein storing comprises storing the result in a general-purpose register indicated by the versatile packed data compare instruction.

14. The method of claim 8, further comprising setting a first flag after determining that at least one comparison operation performed on at least one corresponding pair of corresponding data elements is true.

15. The method of claim 14, further comprising clearing a second flag after determining that no comparison operations performed on the corresponding pairs of corresponding data elements are true.

16. The method of claim 8, wherein receiving comprises receiving a masked versatile packed data compare instruction that indicates a source packed data operation mask that includes a plurality of mask elements, each mask element corresponding to a different corresponding pair of corresponding data elements from the first and second source packed data operands, each mask element to predicate performance of a corresponding comparison operation on the corresponding pair of corresponding data elements from the first and second source packed data operands.

* * * * *